(12) United States Patent
Swierk et al.

(10) Patent No.: US 11,451,744 B2
(45) Date of Patent: Sep. 20, 2022

(54) LIGHTING, COLOR VECTOR, AND VIRTUAL BACKGROUND CORRECTION DURING A VIDEO CONFERENCE SESSION

(71) Applicant: Dell Products, LP, Round Rock, TX (US)

(72) Inventors: Todd E. Swierk, Austin, TX (US); Vivek Viswanathan Iyer, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 17/154,821

(22) Filed: Jan. 21, 2021

(65) Prior Publication Data

US 2022/0232189 A1 Jul. 21, 2022

(51) Int. Cl.
*H04N 7/15* (2006.01)
*G06F 3/0481* (2022.01)
(Continued)

(52) U.S. Cl.
CPC ............. *H04N 7/15* (2013.01); *G06F 3/0481* (2013.01); *G06N 3/04* (2013.01); *G06N 3/08* (2013.01);
(Continued)

(58) Field of Classification Search
CPC ............ H04N 7/15; H04N 5/235; H04N 9/64; H04N 3/04; H04N 3/08; G06F 3/0481; G06T 7/90
(Continued)

(56) References Cited

U.S. PATENT DOCUMENTS

| 6,072,907 A | 6/2000 | Taylor |
| 10,516,890 B2 | 12/2019 | Wang |

(Continued)

FOREIGN PATENT DOCUMENTS

| EP | 2611068 A1 | 7/2013 |
| EP | 3259918 B1 | 8/2020 |
| WO | 2009/019671 A1 | 2/2009 |

*Primary Examiner* — Melur Ramakrishnaiah
(74) *Attorney, Agent, or Firm* — Prol Intellectual Property Law, PLLC; H. Kenneth Prol

(57) ABSTRACT

An information handling system executing a multimedia multi-user collaboration application (MMCA) may include a memory; a power management unit; a camera to capture video of a user participating in a video conference session; a processor configured to execute code instructions of a trained intelligent collaboration contextual session management system (ICCSMS) neural network to receive as inputs: the type of AV processing instruction modules enabled descriptive of how to visually transform a video frame during a video conference session executed by a multimedia multi-user collaboration application; and sensor data from a plurality of sensors including an ambient light sensor to detect ambient light around a participant of the video conference session and a color senser to detect color vectors in the video frame; the processor applies AV processing instruction adjustments to the enabled AV processing instruction modules received as output from the trained ICC SMS machine learning module to adjust the lighting and color vectors of the video frame based on the sensor inputs and the type of AV processing instruction modules.

20 Claims, 9 Drawing Sheets

(51) Int. Cl.
  *G06T 7/90* (2017.01)
  *H04N 9/64* (2006.01)
  *G06N 3/04* (2006.01)
  *G06N 3/08* (2006.01)
  *H04N 5/235* (2006.01)

(52) U.S. Cl.
  CPC ............ *G06T 7/90* (2017.01); *H04N 5/2351* (2013.01); *H04N 9/646* (2013.01); *G06T 2207/10016* (2013.01)

(58) Field of Classification Search
  USPC .......................................... 348/14.01–14.16
  See application file for complete search history.

(56) References Cited

U.S. PATENT DOCUMENTS

| | | | | |
|---|---|---|---|---|
| 2013/0342638 | A1* | 12/2013 | Sobti | G06F 1/1698 |
| | | | | 348/14.08 |
| 2014/0292997 | A1* | 10/2014 | Hung | H04N 7/141 |
| | | | | 348/14.01 |
| 2015/0316978 | A1* | 11/2015 | Kim | G06F 16/40 |
| | | | | 710/308 |
| 2015/0358520 | A1* | 12/2015 | Thimmappa | G09G 3/001 |
| | | | | 348/217.1 |
| 2017/0345130 | A1 | 11/2017 | Wang | |
| 2017/0374374 | A1 | 12/2017 | Wang | |
| 2018/0139458 | A1 | 5/2018 | Wang | |
| 2020/0162274 | A1* | 5/2020 | Iyer | H04N 7/15 |
| 2020/0184603 | A1 | 6/2020 | Mukherjee | |
| 2020/0193328 | A1* | 6/2020 | Guestrin | G06K 9/6256 |
| 2020/0322536 | A1 | 10/2020 | Johansen | |

* cited by examiner

LIGHTING, COLOR VECTOR, AND VIRTUAL BACKGROUND CORRECTION DURING A VIDEO CONFERENCE SESSION

FIELD OF THE DISCLOSURE

The present disclosure generally relates to multimedia, multi-user collaboration applications, such as videoconferencing applications. The present disclosure more specifically relates to lighting, color vector, and virtual background correction during execution of a multimedia, multi-user collaboration applications, such as videoconferencing applications.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a video/graphic display device through which a user may conduct a video conference session.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
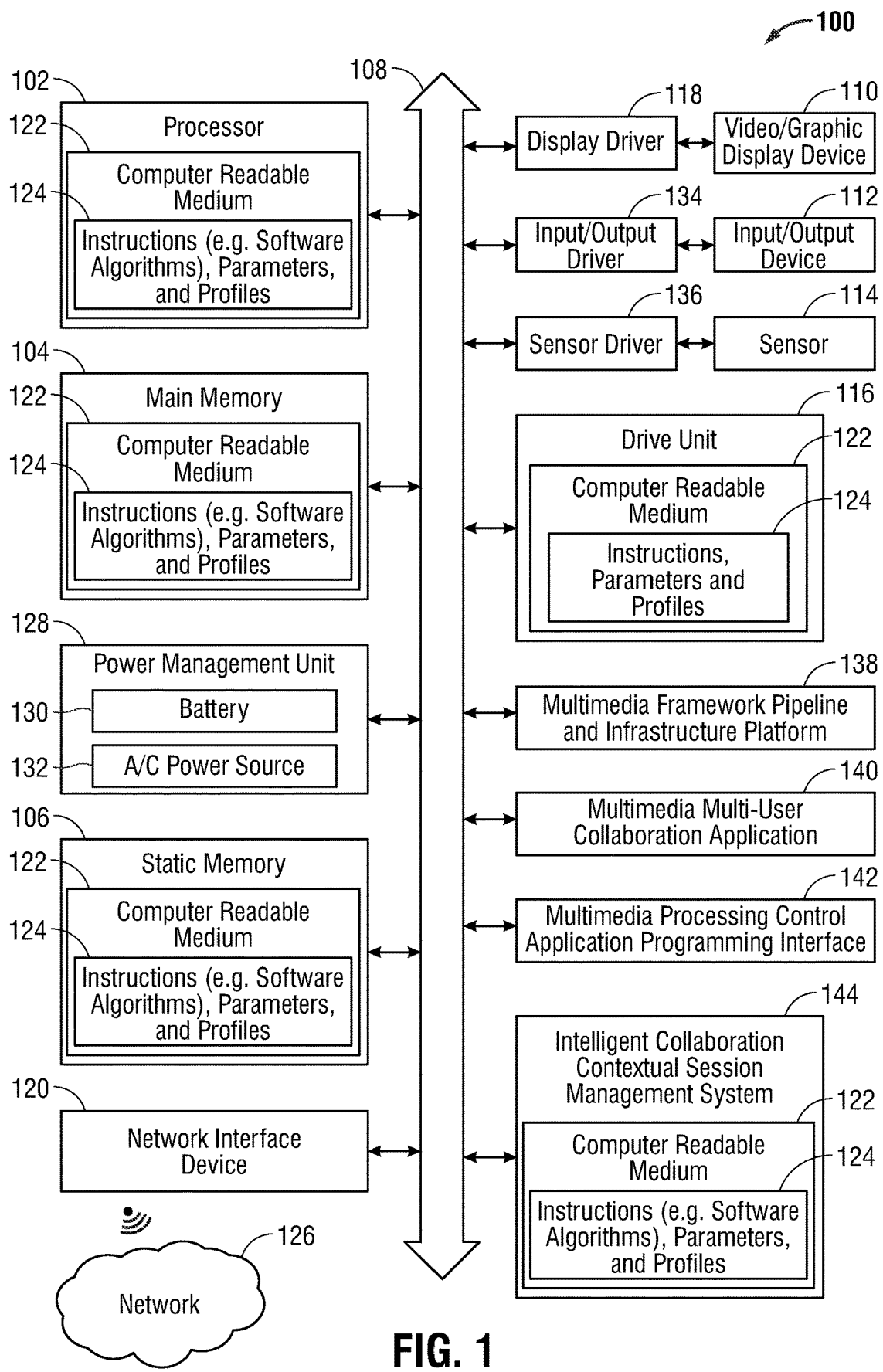
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As working remotely has gained in popularity, so too has the prevalence of multi-employee or multi-business video conferences. Many of these video conferences (also referred to as web-conferences, online meetings, tele-video conferences, or remote conferences) may include a large number of people, sometimes exceeding 50 or 100 participants. In many cases, only one or a handful of meeting participants are actively engaged in the meeting, as presenters, or as active participants in a discussion, for example. However, most existing multimedia multi-user collaboration applications hosting such video conferences perform the same video processing methods on videos of each participant. Such processing may occur both at each individual participant's computing device, and at all other participant's computing devices, after the video of a single participant has been transmitted to the computing devices of all other participants.

Embodiments of the present disclosure provide for an information handling system that includes an intelligent collaboration contextual session management system (ICCSMS) to, upon execution by a processor, receive AV processing instruction module settings descriptive of how to visually transform a video frame data via application of post-processing code set algorithms during a video conference session executed by a multimedia multi-user collaboration application. In the present specification, these one or more instruction modules may be initiated to modify AV data captured at a camera or microphone as described by the user or to enable or improve the video conference experience for the user. This ICCSMS may, in an embodiment, be trained to enable, disable, or otherwise adjust certain lighting and color corrections of a user's image and a virtual background for the video frame presented during the video conference session executed by the multimedia multi-user collaboration application.

In an embodiment, the lighting correction AV processing instruction module, when enabled via a user interface for example, may adjust the lighting of a background surrounding a user's image in the frame via output of a trained machine learning module of the ICCSMS. The lighting correction may also adjust the lighting of the user's image via neural network outputs of the ICCSMS. The lighting correction may further adjust the lighting of a virtual background presented to a user via neural network outputs of the ICCSMS. The lighting correction may also adjust the lighting between the user's image and the virtual background thereby compensating between the lighting differences that may exist between the virtual background and the user's image via neural network outputs of the ICC SMS.

In an embodiment, the color correction AV processing instruction module may detect with, for example, a color sensor, the color vectors and shading associated with the user's image, a background within the video frame and, where enabled, a virtual background used behind the user. The color correction AV processing instruction module, when enabled, may be adjusted by the ICCSMS machine learning module, may adjust the color of the user's image relative to a background or virtual background so that the image quality is increased during the video conferencing session. The color correction feature may also adjust the coloring of the user's image. In some circumstances, the lighting and other factors may cause the charge-coupled device (CCD), the active-pixel sensor (e.g., complementary metal-oxide-semiconductor (CMOS) sensor), or some other image capturing device on a camera to shift color tones within the video frame. When this occurs, colors of the user's image, background, and/or virtual background may be shifted incorrectly. Such a color shift may include red shifting that distorts the actual color of the user's image. Red shifting can occur when the webcam is used in low ambient light conditions as opposed to situations where the user and room are well lit. In these embodiments, the color correction may be conducted to correct for this shift via neural network outputs of the trained neural network ICCSMS. Each of the video frames, these features may be adjustable by the trained neural network ICCSMS altering the color shift adjustment AV processing instruction module.

The virtual background generator is also an AV processing instruction module and may be adjusted by the trained ICCSMS machine learning module. For example, where enabled, the lighting and color vectors associated with the virtual background may be adjusted by the virtual background AV processing instruction module In an embodiment, the information handling system may further include an outline detector AV processing instruction module executed by the video processor to detect an outline of a body of the user to delineate between where a boundary between the image of the user and the virtual background exists. This outline detector may help to delineate between the user's image and a background or virtual background within the video frame in order to complete the color correction and lighting corrections described herein.

In order to present to the user those video frames, the information handling system may include a video/graphic display device. In an embodiment, the video/graphic display device may display a user interface to a user for selecting to enable optional the AV processing instruction modules (such as using a virtual background) and based on the trained ICC SMS neural network (or other machine learning models) selections, apply the trained ICC SMS neural network to optimize the video frames describing how to visually transform a video frame during a video conference session.

The information handling system, in an embodiment, may also include a multimedia framework pipeline and infrastructure platform (MFPIP). In an embodiment, the MFPIP may include a video processing engine to, upon execution by the processor, apply code set instructions of at least one AV processing instruction module to the video frame to adjust the lighting, shading, and color vectors in the video frame based on the optimized neural network outputs to adjust the corresponding AV processing instruction module. In an embodiment, each of the video correction, color correction, and outline detection code set operations on AV data may be associated with one or more of these AV processing instruction modules. As such, as the user may enable and disable any of the those presented at the user interface and, the processor may apply those AV processing instructions modules to each frame of the conference session as adjusted.

In an embodiment, the information handling system may include an AV processing instruction manager to manage, and via adjust optimized outputs of a trained ICC SMS neural network, how the AV processing instruction modules are used to visually transform the video frame during a video conference session. In an embodiment, the AV processing instruction manager chains together these one or more AV processing instruction modules together to allow for successive application and reapplication of the plurality of AV processing instruction modules to the video frame. The order of application of the AV processing instruction modules may vary depending on the optimized transform selections selected by the user at the user interface.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

The information handling system 100 described with reference to FIG. 1 may represent a transmitting (e.g., AV media data source) information handling system or a receiving (e.g., AV media data sink) information handling system in various embodiments. In still other embodiments, information handling system 100 may operate as both a transmitting and a receiving information handling system, as may be the case for an information handling system transmitting video of one participant user while simultaneously executing code instructions for the MMCA 140 to display videos of other participants within a shared user session. In yet another embodiment, the information handling system 100 may operate remotely from all transmitting or receiving information handling systems while executing code instructions of the MMCA 140 to coordinate participation within a user session such as a MMCA control provider server. Additionally, some or all of the intelligent collaboration contextual session management system (ICCSMS) 144 may operate on a server, blade, rack, or cloud-based network maintained and controlled by the manufacturer of several information handling systems, or managed by an employer or enterprise owner of several information handling systems. In such an embodiment, the information handling system 100 may operate within one of these servers, blades, racks, or across various nodes of a cloud-based network to monitor certain performance metrics at each of the plurality of such information handling systems, perform firmware and software updates, confirm security credentials and compliance, and manage user access across the plurality of information handling systems (e.g., as owned by an employer or enterprise corporation). In such an embodiment, each of the plurality of transmitting and receiving information handling systems participating within a user session of the multimedia multi-user collaboration application 140 may incorporate an agent or API for the ICCSMS 144.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input/output (I/O) devices 112, such as a keyboard, a mouse, a video/graphic display 110, or any combination thereof. In an embodiment, the I/O devices 110 may each include an associated input/output driver 134 to be executed by the processor 102 in order to enable an operating system of the information handling system 100 and other computer programs to access hardware functions of the input/output devices 112. The information handling system 100 may further include a display driver 118 to enable an operating system of the information handling system 100 and other computer programs to access the video/graphics display device 110. The information handling system 100 can also include one or more buses 108 operable to transmit communications between the various hardware components. Portions of an information handling system 100 may themselves be considered information handling systems 100 in an embodiment.

Information handling system 100 can include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), graphical processing unit (GPU), vision processing unit (VPU), gaussian neural accelerator (GNA) control logic or some combination of the same. Any of the processing resources may operate to execute code that is either firmware or software code. Moreover, the information handling system 100 can include memory such as main memory 104, static memory 106, computer readable medium 122 storing instructions 124 of the multimedia framework pipeline and infrastructure platform 138 (MFPIP), multimedia multi-user collaboration application 140 (MMCA), multimedia processing control application programming interface 142 (MP-CAPI), intelligent collaboration contextual session management system 144 (ICCSMS), and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse, touchpad, or gesture or touch screen input), and a keyboard. The information handling system 100 can also include a disk drive unit 116.

The network interface device 120 can provide connectivity to a network 126, e.g., a wide area network (WAN), a local area network (LAN), wireless local area network (WLAN), a wireless personal area network (WPAN), a wireless wide area network (WWAN), or other networks. Connectivity may be via wired or wireless connection. The network interface device 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one network interface device 120 may operate two or more wireless links.

The network interface device 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well as the NRFR1, NRFR2, bands, and other known bands. In an embodiment, the network interface device 120 with a wireless adapter may transceive within radio frequencies associated with the 5G New Radio (NR) Frequency Range 1 (FR1) or Frequency Range 2 (FR2), or those associated with 4G LTE and other standards predating the 5G communications standards now emerging. NRFR1 may include radio frequencies below 6 GHz. NRFR2 may include radio frequencies above 6 GHz, made available within the now emerging 5G communications standard. Communications within the WLAN or WWAN may be enabled through the use of either an evolved Node B (eNodeB) executing an evolved packet core of an existing LTE system, or a Next Generation Node B (gNodeB) executing the next generation packet core of the 5G cellular standard.

In some embodiments, software, firmware, dedicated hardware implementations such as application specific integrated circuits, programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. For example, one or more audio/visual (AV) processing instruction modules may be code sets with instructions 124 for performing various processing tasks on outgoing or incoming audio or video data streamed by an MMCA. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 124, parameters, and profiles or receives and executes instructions 124, parameters, and profiles responsive to a propagated signal, so that a device connected to a network 126 can communicate voice, video or data over the network 126. Further, the instructions 124 may be transmitted or received over the network 126 via the network interface device 120 or a wireless adapter, for example.

The information handling system 100 can include a set of instructions 124 that can be executed to cause the computer system to perform any one or more of the methods or computer-based functions disclosed herein. For example, instructions 124 may execute an ICCSMS 144, a MPCAPI 142, a MMCA 140, a MFPIP 138, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116, main memory 104, and static memory 106, may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 may also contain space for data storage. Further, the instructions 124 may embody one or more of the methods or logic as described herein. For example, instructions relating to the ICCSMS 144, MPCAPI 142, MMCA 140, MFPIP 138, software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the ICCSMS 144, MPCAPI 142, MMCA 140, MFPIP 138, may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The ICCSMS 144, MPCAPI 142, MMCA 140, and/or MFPIP 138, may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may further include a power management unit (PMU) 128 (a.k.a. a power supply unit (PSU)). The PMU 128 may manage the power provided to the components of the information handling system 100 such as the processor 102, a cooling system such as a bank of fans, one or more drive units 118, a graphical processing unit (GPU), the video/graphic display device 110, and other components that may require power when a power button has been actuated by a user. In an embodiment, the PMU 128 may be electrically coupled to the bus 108 to provide this power. The PMU 128 may regulate power from a power source such as a battery 130 or A/C power adapter 132. In an embodiment, the battery 130 may be charged via the A/C power adapter 132 and provide power the to the components of the information handling system 100 when A/C power from the A/C power adapter 132 is removed.

The information handling system 100 may also include a sensor 114 or a plurality of sensors 114 that may be operably connected to the bus 108. The sensor 114 may be associated with computer readable medium 122 that may also contain space for data storage in order to store, at least temporarily, data descriptive of the characteristics of a video frame of a during a video conference session executed by a multimedia multi-user collaboration application or characteristics of an environment the user is present within near the information handling system. The sensors 114 may be operatively coupled to a sensor driver 136 to be executed by the processor 102 in order to enable an operating system of the information handling system 100 and other computer programs to access hardware functions of the input/output devices 112.

The sensors 114 may, according to the embodiments of the present specification, perform tasks related to detecting an ambient light around a participant of the video conference session and color vectors and shading in the video frame during a video conference session executed by a MMCA 140. In an embodiment, the sensors 114 may include an ambient light sensor (ALS) to detect the ambient light around the participant or user of the video conference session. In an embodiment, the sensors 114 may include a color sensor to detect color vectors and shading in any number of video frames during the video conference session executed by a MMCA 140. In an embodiment, the sensor 114 may further include a video camera such as a webcam that produces or streams video in real time through the information handling system to other users engaged in the video conference session executed by the MMCA 140. The sensors of the AV processing instruction modules such as those described in connection with FIG. 3 (e.g., 381-388) may use this sensor data with a trained ICCSMS neural network to adjust their operations as described herein. In an embodiment, this webcam may be associated with a distance sensor (e.g., an infrared light sensor) that senses a distance an object is away from the camera. In an embodiment, the webcam may be operatively coupled to a MFPIP 138 that receives distance sensor data from the distance sensor and executes an outline detector AV processing instruction module executed by the video processing device to detect an outline of a body of the user to delineate between where a boundary between the image of the user and the virtual background exists. With the outline of the user's body detected in each video frame, the color and lighting of a virtual background and an image of a user in any video frame may be adjusted according to outputs of a trained ICCSMS 144 as described herein.

The ICCSMS 144 in an embodiment may train and operate a neural network to determine optimized settings (e.g., media capture instructions) at a transmitting information handling system for audio or video capture, settings for execution of various AV processing instructions (e.g., AV processing instruction adjustments) on audio or video samples captured using those settings, or settings (e.g., offload instructions) for the type of processor used to perform such executions, for example. In another example embodiment, the ICCSMS 144 may operate to determine optimized settings at a receiving information handling system (e.g., 100) for execution of various AV processing instructions (e.g., AV processing instruction adjustments) on media samples (e.g., audio samples, video samples, or a combination of both) received from a transmitting information handling system during reprocessing and decoding of such media samples, or settings (e.g., offload instructions) for the type of process used to perform such executions. The ICCSMS 144 in an embodiment may select changes to or modify various settings of various AV processing instruction modules among plural sets of media samples received from a transmitting information handling system during a video conference call in another embodiment.

The ICC SMS 144 in an embodiment may include code instructions 124 for training a neural network, or for executing a neural network. In an embodiment in which the ICC SMS 144 operates to train a neural network, the information handling system 100 may represent the transmitting information handling system, the receiving information handling system, both of these, or an information handling system located remotely from both the transmitting and receiving information handling systems. The ICCSMS 144 in each of these embodiments may gather various input values from a plurality of information handling systems executing the MA/ICA 140 over time in order to determine settings for each of the plurality of information handling systems to decrease processing burden at each information handling system.

In an embodiment, the ICC SMS 144 may be executed by the processor 102 to present to a user a user interface. The user interface presented by the execution of the ICCSMS 144 may include AV processing instruction modules that allow the user to select amongst those video frame transforms that adjust the color and lighting of a virtual background or user image in a video frame. The ICCSMS 144 may receive these user inputs before or during a video conference session is initiated in order to adjust the video frames produced by the video camera such as the webcam.

The information handling system 100 may further include an MA/ICA 140. The MMCA 140 may be any application that, when executed by the processor 102, initiate a video conference session between a plurality of users such as between the user of the information handling system 100 and another remote user of another information handling system. MA/ICA 140 may utilize an MMCA central facility server to engage in the videoconference. With the MFPIP 138 and MPCAPI 142 and per the user selections detected at the ICCSMS 144, the MMCA 140 may transmit to the MFPIP 138 default settings for such processing, reprocessing, encoding, decoding, capture, and display (e.g., via bus 108) of the video frames and present each video frame to the user at the video/graphic display device 110. Examples of a MMCA 140 may include Zoom® developed by Zoom Video Communications, Skype® developed by Skype Technologies of Microsoft, Microsoft Teams® by Microsoft, WebEx® developed by Cisco, GoToMeeting® developed by LogMeIn, among others.

The information handling system 100 may also include a MFPIP 138. The MFPIP 138 may be any video processing system of the information handling system 100 that applies any number of AV processing instruction modules the each of the video frames created as the video camera (e.g., webcam) provides those video frames to the video conference session executed by the MMCA 140. In an embodiment, the MFPIP 138 receives a stream of video frames and, via application of these AV processing instruction modules, adjusts the lighting and color vectors and shading of each of the images as described herein. The MFPIP 138 may also detect the activation or deactivation of a virtual background and adjusts the lighting and color vectors and shading of the video frames.

In an example, the methods described herein may include an optimization of the quality of the video frames produced by the webcam and used during the video conference session executed by the MMCA 140. This optimization process may be used to change the color vectors, shading, lighting, and background of the video frames using any of a plurality of AV processing instruction modules to do so. These AV processing instruction modules are created by using individual video frames as input into a neural network and, via an integrated feedback loop and/or machine learning system, produce as output optimized settings for executing these AV processing instruction modules. In an embodiment, the information handling system 100 may include this neural network used to optimize or adjust settings for these AV processing instruction modules. In some embodiments, these AV processing instruction modules are developed remotely and operated remotely from the information handling system 100 and the output optimized settings are transmitted to the AV processing instruction modules by these remote systems to the information handling system 100. In embodiment, the video frames produced by the video camera of the information handling system 100 are used as specific input to the integrated feedback loop and/or machine learning system in order to develop setting adjustments, of any, to the AV processing instruction modules used in the presently described system and method. In an embodiment, any video frames or even still images may be used to develop the neural network output setting adjustments to the AV processing instruction modules used in the presently described system and method.

Wherever this feedback loop and/or machine learning system is located, the feedback loop and/or machine learning system and method may provide specific types of adjustments to one or more AV processing instruction modules used by the processor 102 or any other processing device associated with the MFPIP 138 to adjust the color vectors and shading, lighting, and background of the streaming video frames received at the MFPIP 138. In an embodiment, an AV processing instruction module may include a background lighting correction AV processing instruction module. The background lighting correction AV processing instruction module may be executed by the processors associated with the MFPIP 138 in order to adjust any video frame by correcting the lighting and color vectors and shading of a background behind a user. These corrections may include lighting corrections, blurring of the background, or changing those color vectors and shading associated with the background. In these embodiments, the background lighting correction AV processing instruction module may follow those optimized setting adjustments provided by the trained ICCSMS 144 neural network described herein in order to make the appearance of the background behind the user relatively more appealing to those viewing the images during the video conference session presented by the MMCA 140.

In an embodiment, an AV processing instruction module may include a color blending/matching AV processing instruction module. The color blending/matching AV processing instruction module may be executed by the processors associated with the MFPIP 138 and information handling system 100 to perform color blending/matching using image statistics of any video frame to correct the color vectors, shading, and lighting between the background or virtual background and an image of a user. In an embodiment, the color matching provided by the execution of the color blending/matching AV processing instruction module by the processor may tone down any reddish skin tones of a user where, for example, the background has a majority color vector of reddish hues. This may allow for better skin tone compositions between the virtual background and the user's image so that the user's image stands out more from the virtual background. These adjustments may be provided from the execution of the trained ICCSMS neural network and done to either or both the background, virtual background, or user's image in order to facilitate this better composition. In an embodiment, the execution of the color blending/matching AV processing instruction module by the processing devices may brighten or darken a background, a virtual background, and/or the image of the user to contrasts or colors to improve this image composition. In an embodiment, where a drastic image composition is detected such as a harsh color or luminance contrast between the background or virtual background and the image of the user, the execution of the color blending/matching AV processing instruction module may blur the background or virtual background accordingly in order to increase the visual composition of the user's image and the video frame. Each of the AV processing instruction modules described in the embodiments herein may receive optimized setting adjustments determined from image input factors of sensor inputs, to a trained ICCSMS neural network.

In an embodiment, an AV processing instruction module may include a luminance/brightness blending AV processing instruction module. The luminance/brightness blending AV processing instruction module may be executed by the processors associated with the MFPIP 138 and information handling system 100 to perform luminance/brightness blending based on the image statistics (e.g., detected brightness/luminance). In an embodiment, the luminance/brightness blending provided by the execution of the luminance/brightness blending AV processing instruction module by the processor may be adjusted by received optimized settings from the trained ICCSMS 140 neural network to darken or brighten the background or virtual background, or image of the user relative to each other. This may allow for better image composition of the user's image or the backgrounds in the video frames.

In an embodiment, an AV processing instruction module may include an outline detection AV processing instruction module. The outline detection AV processing instruction module may, along with data received from the video camera and distance sensor, delineate visually between a user's image in a foreground of the video frames from the background further behind the user. It is common for a user to engage in the video conference session initiated by the MMCA 140 within an office or other room where noise may be eliminated and privacy may be maintained. In these circumstances, the user may be positioned somewhere between the video camera of the information handling system 100 and a wall behind the user. In some instances, the outline detection AV processing instruction module may separate these two planes leaving the user's image in front while, in some embodiments, adjusting the background by blurring the background, color matching the background, adjusting the color vectors, shading, and luminance of the background, or adding in a virtual background to visually replace those images behind the user. In this instance, execution of the outline detection AV processing instruction module by the processor of the MFPIP 138 results in the MFPIP 138 further altering the color vectors, shading, and luminance of the background, virtual background and/or user's image appropriately in order to increase the visual aspects of the video frames provided to other users during the video conference session. Settings to the outline detection AV processing instruction module may be optimized by the trained ICCSMS neural network as well.

In an embodiment, an AV processing instruction module may include a facial lighting correction AV processing instruction module. The facial lighting correction AV processing instruction module may be executed by the processors associated with the MFPIP 138 and information handling system 100 to adjust the lighting associated with a face of the user presented by the MMCA 140 during a video conference session. The adjustment of the lighting associated with the user's face may be conducted, via trained ICCSMS 140 neural network output, for each video frame presented by the MMCA 140. In some lighting circumstances, the lighting of a user's face (or lack thereof) may cause the charge-coupled device (CCD), the active-pixel sensor (e.g., complementary metal-oxide-semiconductor (CMOS) sensor), or some other image capturing device on a camera to shift color tones within the video frame. When this occurs, colors of the user's face may be shifted incorrectly thereby not reflecting the user's true facial color tones. Such a shift may include red shifting or other skin tone distortions that distorts the actual color of the user's facial image. In these embodiments, the facial lighting correction AV processing instruction module may be executed by the processor to correct for this shift. Each of the video frames produced, the images of the user's face may be adjustable according to the optimized output settings presented by the trained ICCSMS 144 neural network.

As described herein, an AV processing instruction module may include a virtual background blur AV processing instruction module. The virtual background blur AV processing instruction module may be executed by the processors associated with the MFPIP 138 and information handling system 100 to blur a background or a virtual background presented in the video frames behind the user. As described herein, the virtual background blur AV processing instruction module may blur the background or virtual background in order to increase the visual composition of the user's image and the video frame. In some instances, the ambient light sensor (ALS) and color sensing (CRGB) sensor may indicate that the contrast between the user's image and the background or virtual background may be insufficiently lighted, too bright, or contrasting visually with the colors of the images of the user such that blurring the background would increase the visual composition of the video frame. In an embodiment, the virtual background blur AV processing instruction module may provide input data to the trained ICCSMS 140 neural networks with the data from these sensors as well as others described herein. The trained ICCSMS neural network may provide output optimized settings to blur the background or virtual background depending on the AV media instruction module.

In the context of the present specification, the background lighting correction AV processing instruction module, the color blending/matching AV processing instruction module, the luminance/brightness blending AV processing instruction module, the outline detection AV processing instruction module, the facial lighting correction AV processing instruction module, and the virtual background blur AV processing instruction module may each be individually executed by the processor at the MFPIP 138. The trained ICCSMS 140 neural network may provide output optimized settings to each of these AV processing instruction modules to adjust their functions. Although the present specification describes these specific types of models that are executed and applied to each video frame, the present specification contemplates that additional AV processing instruction modules may be developed and applied.

In an embodiment, the information handling system 100 includes a MPCAPI 142. The MPCAPI 142 in an embodiment may operate to facilitate communication between various applications, controllers, and drivers of the information handling system 100 in an embodiment. For example, the MPCAPI 142 may interface between the MFPIP 138 and the sensors 114 such as the camera, the ALS, and the CRGB, among others. The MPCAPI 142 may, during operation of the information handling system 100, receive the individual video frames and direct the AV processing instruction modules to be applied per the AV processing instruction modules enabled at the ICCSMS 144. In an embodiment, the MPCAPI 142 may conduct an offloading process where the MPCAPI 142 selects among a plurality of processing resources to apply these AV processing instruction modules to each frame. For example, instead of using the processing resources associated with the processor 102, the MPCAPI 142 may direct a graphical processing unit (GPU), vision processing unit (VPU), gaussian neural accelerator (GNA) control logic or some combination of the same to process this data. This may allow for the processor 102 to engage in other processing activities during the video conference session executed by the MMCA 140. Still further, the MPCAPI 142 may cause data from each of the sensors 114, via the sensor drivers 136, to be sent to this other processing resource at the MFPIP 138.

In an embodiment, the MFPIP 138, MMCA 140, MPCAPI 142, and ICCSMS 144 may communicate with the main memory 104, the processor 102, the video/graphic display device 110, a keyboard, and the network interface device 120 via bus 108, and several forms of communication may be used, including ACPI, SMBus, a 24 MHZ BFSK-coded transmission channel, or shared memory. Driver software, firmware, controllers and the like may communicate with applications on the information handling system 100.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
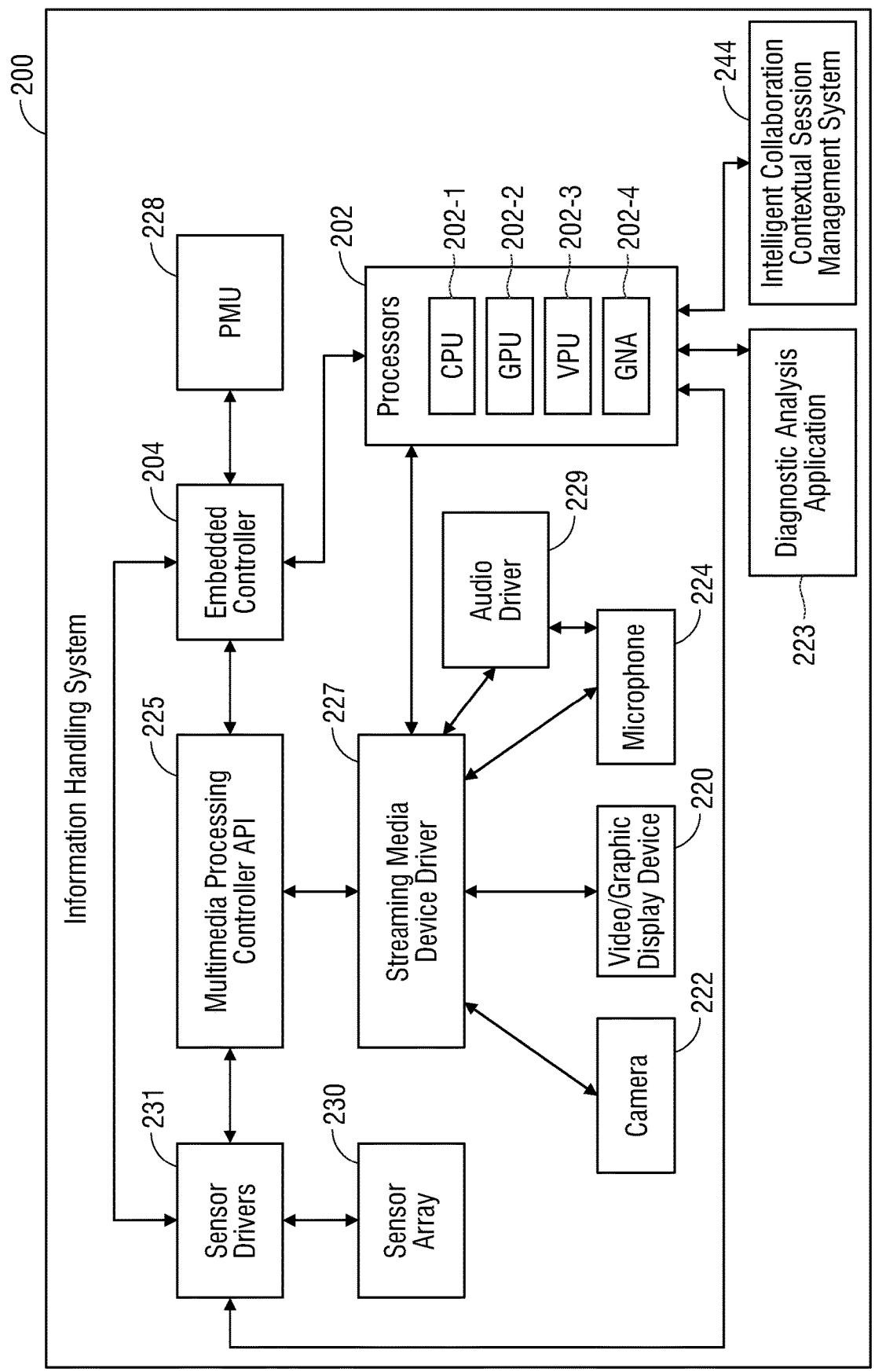
FIG. 2 is a block diagram illustrating various drivers and controllers in communication with a plurality of peripheral devices of an information handling system according to an embodiment of the present disclosure.

FIG. 2 is a block diagram illustrating various drivers and processors in communication with a plurality of peripheral devices of an information handling system according to an embodiment of the present disclosure. FIG. 2 shows the operative couplings of a number of devices and processes present and executed within the information handling system 200 during operation of the information handling system 200. During operation, the information handling system 200 may be powered on via use of an on switch on the PMU 228. The PMU 228 may power on an embedded controller 204 that, in an embodiment, executes a basic input/output system (BIOS) and, in an embodiment, an operating system (OS).

As described herein, the ICCSMS 244 may optimize various settings for peripheral devices used in the capture of media samples played during user sessions for a multimedia multi-user collaboration application as well as receive input from various sensors and user inputs to apply, to various video frames, an appropriate number of AV processing instruction modules. The intelligent collaboration contextual session management system ICCSMS may modify media capture settings, AV processing instructions applied to such captured media samples, or the type of processor used to perform such AV processing instructions in order to optimize performance of the multimedia multi-user collaboration application on one or more information handling systems in an embodiment.

A neural network of the ICCSMS 244 in an embodiment may make such optimization determinations for each individual information handling system (e.g., 200) separately. Such a determination may be made based upon a plurality of inputs describing hardware and software capabilities and performance metrics of the information handling system at issue, default media capture instructions and default AV processing instructions generated by the multimedia multi-user collaboration application, various sensor readings taken at the information handling system, and meeting metrics describing user participation and performance of the multimedia multi-user collaboration application.

These neural network input values may be gathered from a plurality of sensors (e.g., an ALS, distance sensor, or CRGB), peripheral devices, and diagnostic applications. For example, the embedded controller 204 may gather information describing state of charge for a power management unit 203, which may include a battery and an AC adapter, as described with reference to FIG. 1. Such state of charge information may be gathered by the embedded controller 204 in an embodiment while the information handling system 200 is operating solely on battery power, and when the PMU 203 is receiving power via the AC adapter. The embedded controller 204 in an embodiment may gather such metrics through direct communication with the processor 210 (e.g., CPU, GPU, VPU, GNA, etc.) and with the power management unit (PMU) 203. In some embodiments, such communication may occur in kernel mode.

In an embodiment, the ICC SMS 244 may be integrated, in whole or in part, in some embodiments within an information handling system performance optimizer application located remotely from the information handling system 200. In such an embodiment, the information handling system performance optimizer application may operate to manage security credentials, connectivity credentials, performance optimization, software updates, and other various routine computing maintenance tasks for a plurality of information handling systems (e.g., including 200) owned by an enterprise business or produced by a single manufacturer. The Dell® Optimizer® software application is one example of such an information handling system performance optimizer application. The information handling system performance optimizer application in such an embodiment may communicate with the embedded controller 204 to receive high-level hardware performance metrics from each of the plurality of information handling systems (e.g., including 200) it manages during routine out-of-band communications between the information handling system performance optimizer application and all managed information handling systems. Such out-of-band communications with the embedded controller 204 in an embodiment may be used to check security credentials or performance statistics for the information handling systems (e.g., 200), or to push software or firmware updates to the information handling systems, for example. During such routine maintenance, the information handling system performance optimizer application may accumulate, sort, and analyze all performance metrics received from all managed information handling systems (e.g., 200). Out-of-band communications initiated in such a way between the embedded controller 204 and the information handling system performance optimizer application may be via a wireless network such as Wi-Fi or cellular, or via wired connection. Such out-of-band communications operate without need for Operating System intervention or function and may operate behind the scenes to ensure optimized function for managed information handling systems.

During operation, the ICCSMS 244 further receives a number of inputs relative to the operation of one or more user AV processing instruction modules at the ICCSMS 244 trained neural network. In an embodiment, a user may actuate at a graphic user interface (GUI) one or more AV processing instruction modules that allow the user to have adjustments made to the visual composition of each video frame of a video conference session. These adjustments include those adjustments that the background lighting correction AV processing instruction module, the color blending/matching AV processing instruction module, the luminance/brightness blending AV processing instruction module, the outline detection AV processing instruction module, the facial lighting correction AV processing instruction module, and the virtual background blur AV processing instruction module each, when executed by the processor 202, adjust. In these embodiments, the GUI may include a list of potential AV processing instruction module adjustments that may be made to the video frames. In an embodiment, as the user actuates or otherwise selects any AV processing instruction modules, the results of the ICCSMS neural network driven adjustments may be seen, in real-time, on a video feed provided to the user at a video/graphic display device 220 prior to or during a video conference session executed by the MMCA as described herein.

As another example of gathering inputs for a neural network of the ICCSMS 244, software performance metrics may be generated at a diagnostic analysis application 223, based at least in part on communication between the diagnostic analysis application 223 and the processor 202. Such a diagnostic analysis application 223 may operate to gather metrics describing CPU usage or load, as well as a breakdown of the CPU usage attributable to each of a plurality of applications (e.g., including a multimedia multi-user collaboration application) running via the operating system of the information handling system 200. In some embodiments, the diagnostic analysis application 223 may provide similar metrics for other types of processors for the information handling system, including, for example, a graphics processing unit (GPU), vision processing unit (VPU), or gaussian neural accelerator (GNA). One example of such a diagnostic analysis application 223 in an embodiment may include the Microsoft® Diagnostic Data Viewer® software application. In an embodiment, these software performance metrics may be generated at the diagnostic analysis application 223 and transmitted to the neural network of the ICCSMS 244 via multimedia processing controller API 225.

FIG. 2 further shows that the adjustments to the visual composition of the video frames may be facilitated through the use of a number of sensors such as a camera 222 and other sensors or sensor array 230. In an embodiment, the sensor array 230 may an ambient light sensor (ALS) and a color sensing (CRGB) sensor. The ALS of the sensor array 230 may detect an amount of ambient light present at the camera 222 or within a room where the user is conducting the video conference session. The CRGB sensor that detects a color of ambient light around the user and the information handling system by sensing the temperature of those colors. In an example, a 5000K color temperature detected may indicate more of a blue or white color is present if under fluorescent light whereas a 3000K color temperature detected may indicate a more warm color such as red is present in the room. As described herein, each of these sensors, along with the camera 222, may be used to provide data to the processor 202 (e.g., CPU 202-1, GPU 202-2, VPU 202-3, GNA 202-4, etc.) in order to make those adjustments to the video frames as described herein. Specifically, the data from the sensors received by the processor 202 may be provided to the neural network of the ICCSMS 244 as described herein.

During the operation of the information handling system 200, drivers may be executed by the processor 202 to enable an OS of the information handling system 200 and other computer programs to access hardware functions of the input/output devices, sensors of the sensor array 230, and the camera 222, among others. These drivers working through a streaming media device driver 227 may help to facilitate the transmission of data from the individual sensors to the processor 202 or other processing device responsible for adjusting the visual composition of the video frames as described herein.

In an embodiment, the information handling system 200 may include a microphone 224 that provides audio input to the video conference session along with the video input from the camera 222. The audio may be provided to any user engaged in the video conference session in real time to facilitate the interaction between the users over the network.

The information handling system 200 may further includes a MPCAPI 225. The MPCAPI 225 in an embodiment may operate to facilitate communication between various applications, controllers, and drivers of the information handling system 200 in an embodiment. For example, the MPCAPI 225 may interface between a MFPIP and the sensors of the sensor array 230 such as the camera, the ALS, and the CRGB, among others. The MPCAPI 225 may, during operation of the information handling system 200, receive the individual video frames and direct the AV processing instruction modules to be applied per the AV processing instruction modules enabled at the ICC SMS 244.

The streaming media driver 227 in such an embodiment may receive video or audio samples captured by peripheral cameras or microphones in communication therewith, according to default or optimized media capture instructions. In another embodiment, the audio driver 229 may receive audio samples captured by the microphone 224 in communication therewith, according to such received media capture instructions. In such an embodiment, the audio driver 229 may operate as a mini-driver or child device to the parent device streaming media driver 227. The streaming media device driver 227 may be in communication with an AV processing instruction manager via one or more ports (e.g., as described in greater detail with respect to the of FIG. 4) such that video or audio samples received by the streaming media device driver 227 may be transmitted to an AV processing instruction manager, in an embodiment. The audio driver 229 may be in communication with the AV processing instruction manager such that audio samples received by the audio driver 229 may be transmitted to the AV processing instruction manager (e.g., via the audio processing engine, or via the streaming media driver, for example) in an embodiment. In such a way, the AV processing instruction manager may direct retrieval of a video sample captured at a camera operably connected to information handling system 200 and retrieval of an audio sample captured at a microphone operably connected to information handling system 200.

Figure 3:
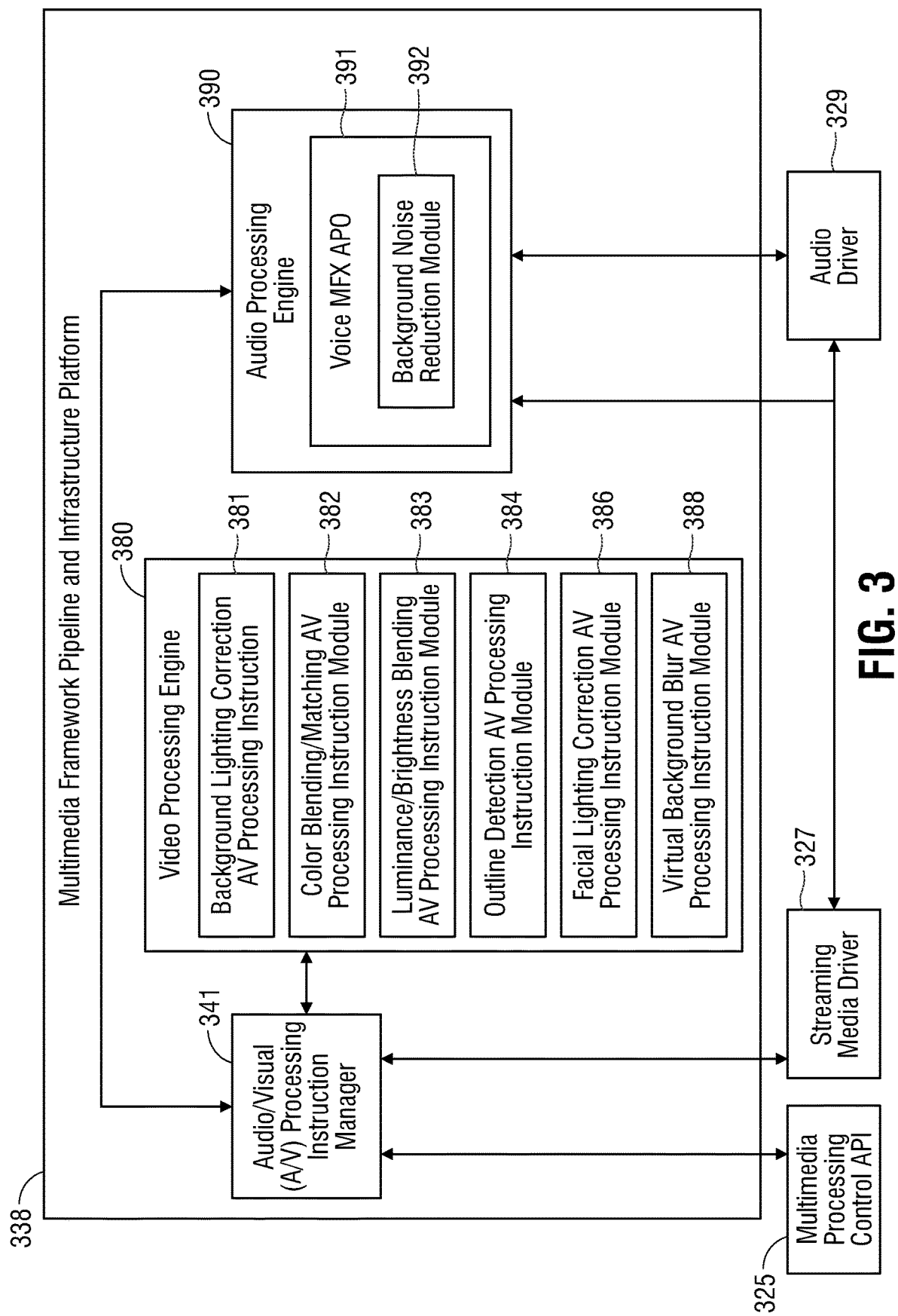
FIG. 3 is a block diagram illustrating a multimedia framework pipeline and infrastructure platform of an information handling system according to an embodiment of the present disclosure.

FIG. 3 is a block diagram illustrating a MFPIP 338 of an information handling system according to an embodiment of the present disclosure. The MFPIP 338, in the present embodiment, may form part of the information handling system 200. In an embodiment, the MFPIP 338 may be remote from the information handling system 200 as part of a distributed peer computer system that provides processing of the video frames of the video conference session remotely for a thin-client-type information handling system.

The MFPIP 338 may interface with a number of drivers via streaming media driver 327 of the information handling system as described herein in order to enable an operating system of the information handling system and other computer programs to access the devices used during the execution of the processor of the information handling system. The streaming media driver 327 may be a driver that, when executed by the processor, enable the operating system of the information handling system and other computer programs to distribute the video frames, as adjusted by operation of the MFPIP 338 as described herein. This data stream provided by the streaming media driver 327 may be sent across a network via, for example, a network interface device of the information handling system as described herein. The streaming media driver 327 in such an embodiment may receive video or audio samples captured by peripheral cameras or microphones in communication therewith, according to default or optimized media capture instructions, as described with reference to FIG. 2. In another embodiment, the audio driver 329 may receive audio samples captured by a microphone in communication therewith, according to such received media capture instructions. In such an embodiment, the audio driver 329 may operate as a mini-driver or child device to the parent device streaming media driver 327. The streaming media driver 327 may be in communication with the AV processing instruction manager 341 via one or more ports (e.g., as described in greater detail with respect to the device proxy of FIG. 4) such that video or audio samples received by the streaming media driver 327 may be transmitted to the AV processing instruction manager 341 in an embodiment. The audio driver 329 may be in communication with the AV processing instruction manager 341 such that audio samples received by the audio driver 329 may be transmitted to the AV processing instruction manager 341 (e.g., via the audio processing engine 390, or via the streaming media driver 327) in an embodiment. In such a way, the AV processing instruction manager 341 may direct retrieval of a video sample captured at a camera operably connected to information handling system and retrieval of an audio sample captured at a microphone operably connected to information handling system.

The audio driver 329 may interface with the operating system and be executed by the processor in order to drive, for example, a specific audio device such as a microphone and an audio card. The audio driver 329 may, in the embodiments herein, interface with an audio processing engine 390 that includes a voice mode effects audio processing object (MFX APO) 391. The driver may allow the MFX APO 391 to interface with the operating system in order to provide audio during the video conference session executed on the MMCA 140. In an embodiment, the MFX APO 391 provides software based digital signal processing for the video conference session. Examples of a MFX APO 391 include graphic equalizers, reverb, tremolo, Acoustic Echo Cancellation (AEC) and Automatic Gain Control (AGC). In an embodiment, the MFX APO 391 may be COM-based, real-time, in-process objects. During execution of the MFX APO 391, a background noise reduction module 392 or any other audio-based AV processing instruction module may be executed to adjust the audio output during the video conference session.

The MFPIP 338 may include a driver stack working with the streaming media driver 327 that operates other drivers such as those associated with the sensors. For example, and in the embodiments here, the sensors may include an ALS and a CRGB that detect the ambient light around the user (e.g., ambient luminance and color/temperature). As an example, the ALS and/or CRGB sensors may primarily be used to auto dim and alter the color of the screen to match the environment (e.g., not full brightness of screen when client is in lower light or dark conditions; and color matching the background environment for morning vs afternoon light, for example). These sensors may help inform, as input, as to how to handle image brightness based on the ambient conditions. The driver stack working with the streaming media driver 327 may therefore be a combination of drivers that plug into each other with each of the drivers adding to a chain of drivers that may be executed in serial by the processor. For example, the driver associated with the video camera of the information handling system may be executed prior to any of the sensors so that a video frame may first be obtained prior to the data from the sensors being used to adjust the visual composition of the video frame.

The MFPIP 338 may also include an AV processing instruction manager 341. The AV processing instruction manager 341 may be any processor that coordinates operation of the AV processing with the ICC SMS as described herein and cause one or more AV processing instruction modules to be used to visually transform the one or more video frames during the execution of the video conference session. The AV processing instruction manager 341 may interface with a video processing engine 380 to cause one or more of the AV processing instruction modules to be executed so as to apply the appropriate visual changes to each video frame according to the optimized settings determined via the trained ICC SMS neural network.

For example, the AV processing instruction manager 341 may receive input from a user and sensors at the ICCSMS neural network and provide, as output, optimized outputs to adjust the background lighting or facial lighting AV processing instruction modules at the video frame. In this embodiment, the AV processing instruction manager 341 may cause the video processing engine 380 to execute one or more of a background lighting AV processing instruction module 381 or a facial lighting correction AV processing instruction module 386. Where both the lighting associated with the background and the face of the user are to be corrected, the AV processing instruction manager 341 may direct the video processing engine 380 to execute the background lighting correction AV processing instruction module 381 and facial lighting correction AV processing instruction module 386 either individual or in series as described herein.

Similarly, the AV processing instruction manager 341 may direct the video processing engine 380 to execute the other AV processing instruction modules 381, 382, 383, 384, 386, 388 to adjust the visual composition of the one or more video frames. For example, the AV processing instruction manager 341 may receive input from a user and sensors at the ICC SMS neural network and provide, as output, optimized output settings to adjust the color blending/matching AV processing instruction module 382. The color blending/matching AV processing instruction module 382 may be executed by the processors (e.g., CPU, VPU, GPU, GNA, etc.) associated with the MFPIP 338 and information handling system to perform color blending/matching using image statistics of any video frame to correct the color vectors, shading, and lighting between the background or virtual background and an image of a user. In an embodiment, the color matching provided by the execution of the color blending/matching AV processing instruction module 382 by the processor may adjust skin tones of a user where, for example, the background has a majority color vector that changes the hues of a user's skin tone (e.g., red shifting skin tones). This may allow for better skin tone compositions between the virtual background and the user's image so that the user's image stands out more from the virtual background. These adjustments may be done to either or both the background, virtual background, or user's image in order to facilitate this better composition. In an embodiment, the execution of the color blending/matching AV processing instruction module 382 by the processing devices may brighten or darken a background, a virtual background, and/or the image of the user to increase this image composition. In an embodiment, where a drastic image composition is detected such as a harsh color or luminance contrast between the background or virtual background and the image of the user, the execution of the color blending/matching AV processing instruction module may blur the background or virtual background accordingly in order to increase the visual composition of the user's image and the video frame.

In an embodiment, the AV processing instruction manager 341 may receive input from a user and sensors and provide this data at the ICCSMS neural network and provide, as output, optimized output settings to adjust an outline detection AV processing instruction module 384. The outline detection AV processing instruction module 384 may, through the provision of data to the ICCSMS neural network received from a video camera and a distance sensor, delineate visually between a user's image in a foreground of the video frames from the background further behind the user. It is common for a user to engage in the video conference session initiated by a MMCA within an office or other room where noise may be eliminated and privacy may be maintained. In these circumstances, the user may be positioned somewhere between the video camera of the information handling system and a wall behind the user. In some instances, the outline detection AV processing instruction module 384 may separate these two planes leaving the user's image in front while, in some embodiments, adjusting the background by blurring the background, color matching the background, adjusting the color vectors, shading, and luminance of the background, or adding in a virtual background to visually replace those images behind the user. In this instance, execution of the outline detection AV processing instruction module by the processor of the MFPIP 338 results in the MFPIP 338 further being capable of better altering the color vectors, shading, and luminance of the background, virtual background and/or user's image appropriately in order to increase the visual aspects of the video frames provided to other users during the video conference session.

The AV processing instruction manager 341 may receive input from a user and sensors and provide that data at the ICC SMS neural network to provide, as output, optimized output settings to adjust the luminance/brightness blending AV processing instruction module 383. The luminance/brightness blending AV processing instruction module 383 may be executed by the processors associated with the MFPIP 338 and information handling system to perform luminance/brightness blending based on the image statistics (e.g., detected brightness/luminance). In an embodiment, the luminance/brightness blending provided by the application of the recommended settings from the ICCSMS neural network to the luminance/brightness blending AV processing instruction module 383 by the processor may darken or brighten the background or virtual background, or image of the user relative to each other. This may allow for better image composition of the user's image or the backgrounds in the video frames.

The AV processing instruction manager 341 may receive input from a user and sensors at the ICCSMS neural network and provide, as output, optimized output settings to adjust the virtual background blur AV processing instruction module 388. The output recommended settings from the ICCSMS neural network to the virtual background blur AV processing instruction module 388 may be executed by the processors associated with the MFPIP 338 and information handling system to blur a background or a virtual background presented in the video frames behind the user. As described herein, the virtual background blur AV processing instruction module 388 may blur the background or virtual background in order to increase the visual composition of the user's image and the video frame. In some instances, the ambient light sensor (ALS) and color sensing (CRGB) sensor may provide data to the ICCSMS neural network indicating that the contrast between the user's image and the background or virtual background may be insufficiently lighted, too bright, or contrasting visually with the colors of the images of the user such that blurring the background would increase the visual composition of the video frame. In an embodiment, the optimized settings provided by the ICCSMS neural network to the virtual background blur AV processing instruction module 388 may be created with the data from these sensors as well as others described herein and blur the background or virtual background depending on which AV processing instruction modules that have been enabled by the user on the ICC SMS.

As described herein, the multimedia processing control API 325 may operate, at least in part, as a hub to facilitate communication between various hardware, firmware, and software applications operating at information handling system, and the ICC SMS. As another example of this, the multimedia processing control API 325 may receive software performance metrics generated at a diagnostic analysis application, for example, describing applications available or running, number of videoconference participants, CPU usage or load, as well as a breakdown of the CPU usage attributable to each of a plurality of applications (e.g., including a MMCA) running via the operating system of the information handling system. The multimedia processing control API 325 may forward these software performance metrics to the neural network of the ICCSMS, in an embodiment.

In yet another example of the multimedia processing control API 325 facilitating communication with the ICCSMS, the multimedia processing control API 325 may receive sensor readings taken from one or more sensors (e.g., distance sensor, CRGB, ALS) of the information handling system via the sensor drivers, as described in greater detail with respect to FIG. 2. In still another example of the multimedia processing control API 325 facilitating communication with the ICCSMS, the multimedia processing control API 325 may receive default media capture instructions, default AV processing instructions, or captured audio samples from a streaming media driver 327, as described in greater detail with respect to FIG. 2. For example, audio samples may be used in some embodiments in order to determine the frequency with which the user of the information handling system is talking during a user session of the multimedia multi-user collaboration application. In other embodiments, the multimedia processing control API 325 may receive default media capture instructions or default AV processing instructions via direct communication with the MFPIP 338.

Figure 4:
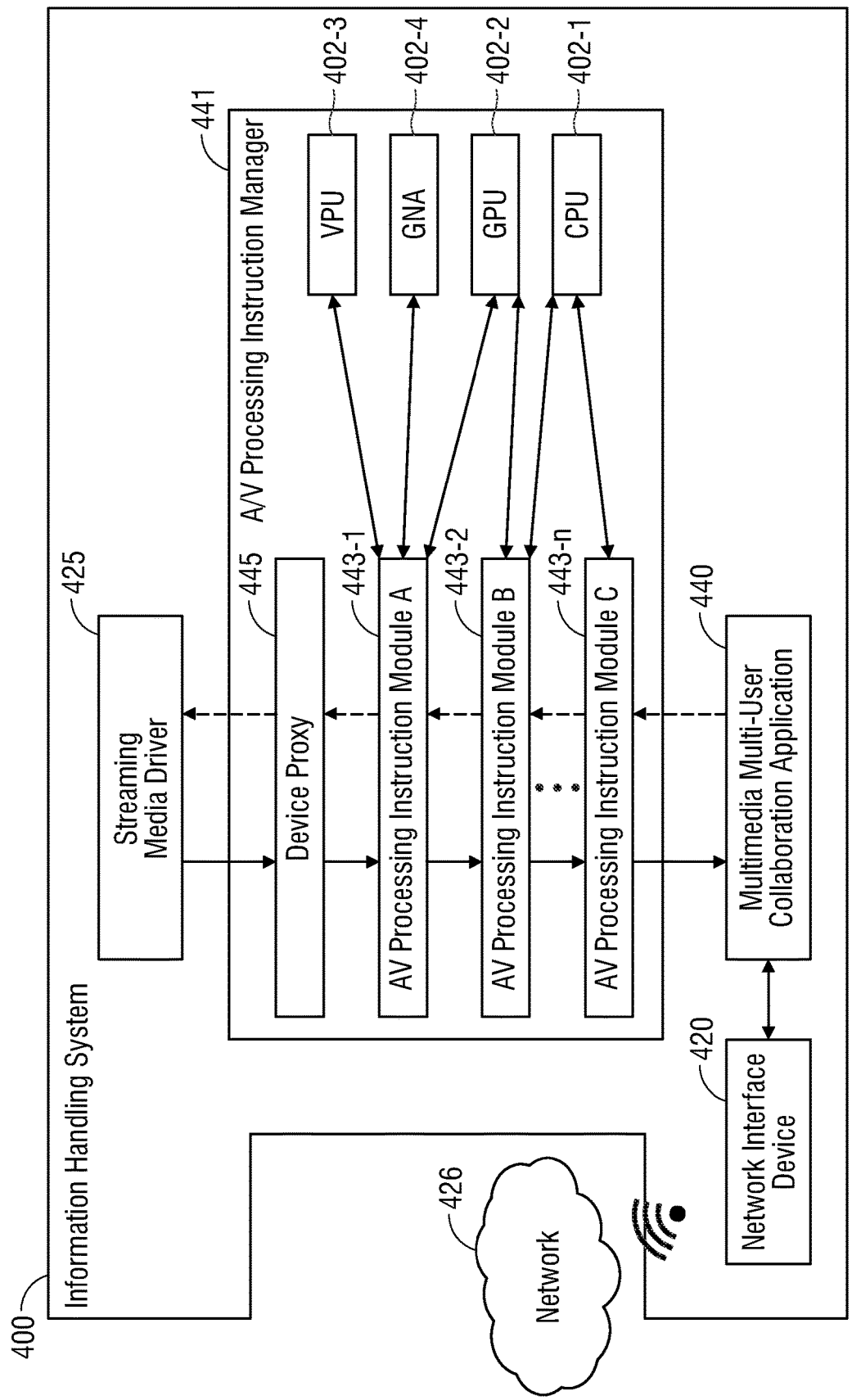
FIG. 4 is a block diagram illustrating audio/visual (AV) processing instruction manager for optimizing information handling system operation of a multimedia, multi-user collaboration application according to an embodiment of the present disclosure.

FIG. 4 is a block diagram illustrating audio/visual (AV) processing instruction manager for optimizing information handling system operation of a multimedia, multi-user collaboration application according to an embodiment of the present disclosure. FIG. 4 shows an AV processing instruction manager 441 interacting with a streaming media driver 425 and multimedia multi-user collaboration application (MMCA) 440 according to an embodiment of the present disclosure. As described herein, the AV processing instruction manager 441 may cause one or more AV processing instruction modules to adjust the visual composition of any of the video frames received by the processor (e.g., CPU 402-1, GPU 402-2, VPU 402-3, GNA 402-4) for a video conference session by the MMCA 440. As described herein, the AV processing instruction manager 441 may form part of a user's information handling system. In another embodiment, the processes and hardware associated with the AV processing instruction manager 441 may be remote from the information handling system in a distributed processing scenario allowing the information handling system to be a thin client device.

As described herein, the AV processing instruction manager 441 may direct the application of any number of AV processing instruction modules to each video frame produced by the camera and processor during the video conference session. In the embodiment shown in FIG. 4, these AV processing instruction modules may be chained together that successively processes the video frames before those video frames are sent to the MMCA 440 and presented to the users engaged in the video conference session. The AV processing instruction manager 441 may include a device proxy 445. The device proxy 445 may be any device that, in an embodiment, uses resources other than a main central processing unit (CPU) such as a GPU, a VPU, GNA, among others. In an embodiment, the device proxy 445 may route or map connections between physical pins of the streaming media driver 425 (or other drivers) and the AV processing instruction manager 441.

With the device proxy 445, the AV processing instruction manager 441 may apply a number of AV processing instruction modules 443-1, 443-2, 443-*n* (e.g., AV processing instructions A, B, and C, respectively). The AV processing instruction modules 443-1, 443-2, 443-*n* may include any sets of instructions defined by any number of the AV processing instruction modules used to adjust the visual composition of each of the video frames. These AV processing instruction modules may include a background lighting correction AV processing instruction module, a color blending/matching AV processing instruction module, a luminance/brightness blending AV processing instruction module, an outline detection AV processing instruction module, a facial lighting correction AV processing instruction module, and a virtual background blur AV processing instruction module as described herein among others.

The information handling system 400 in an embodiment may include a plurality of processors, including, for example, a central processing unit (CPU) 402-1, a graphics processing unit (GPU) 402-2, a vision processing unit 402-3, and a gaussian neural accelerator (GNA) 402-4. The CPU 402-1 in an embodiment may execute the bulk of tasks relating to all software applications running via the operating system (OS), which may include the MMCA 440, the MFPIP incorporating the AV processing instruction manager 441, as well as several others. Increased processing load placed on the CPU 402-1 by the AV processing instruction manager 441 during execution of a user session for the MMCA 440 may decrease the processing resources left available for all other applications also running at the OS, which may include word processing applications (e.g., Microsoft® Word®), presentation applications (e.g., Microsoft (ID PowerPoint®), e-mail applications, web browsers, and other applications routinely used in conjunction with the multimedia multi-user collaboration application throughout a typical workday.

The GPU 402-2 in an embodiment may be a processor specialized for rapidly manipulating and altering memory to accelerate the creation of a video sample using a plurality of captures images stored in a frame buffer. GPU 402-2 may be more efficient at manipulating such stored video samples during image processing performed by one or more of the AV processing instruction modules (e.g., 443-1, 443-2, and 443-*n*) in an embodiment. The VPU 402-3 in an embodiment may be specialized for running machine vision algorithms such as convolutional neural networks (e.g., as used by the color blending/matching AV processing instruction module, luminance/brightness blending AV processing instruction module, outline detection AV processing instruction module, facial lighting correction AV processing instruction module, and virtual background blur AV processing instruction module described with reference to FIG. 3). The GNA 414 in an embodiment may comprise low-power co-processor to the CPU, or a System on a Chip (SoC) that can run under very low-power conditions to perform a specialized task, such as real-time translations ongoing conversations, or various other audio and video processing methods represented by any one of the AV processing instruction modules 443-1, 443-2, or 443-*n*. The GNA 414 may operate in an embodiment to offload continuous inference workloads from the CPU 402-1, GPU 402-2, or VPU 402-3, including but not limited to noise reduction or speech recognition, to save power and free CPU 402-1 resources.

Each of the AV processing instruction modules (e.g., 443-1, 443-2, and 443-*n*) in an embodiment may be sets of algorithms or code instructions executed via the operating system (OS), using one of the processors of the information handling system 400 for modification of video data or audio data relating to streaming video conferencing applications. It is understood that any number of AV processing instruction modules is contemplated in discussing 443-1 through 443-*n*. A single processor may execute each of the AV processing instruction modules (e.g., 443-1, 443-2, and 443-*n*), a subgroup thereof, or may even execute a single AV processing instruction, according to various embodiments. The AV processing instruction manager 441 in an embodiment may determine which processor to access in order to execute each AV processing instruction modules (e.g., 443-1, 443-2, and 443-*n*) in an embodiment, based on offload instructions received from the intelligent collaboration contextual session management system in some embodiments. For example, in an embodiment in which the information handling system 400 acts as the media source, the AV processing instruction manager 441 may access the VPU 402-3 or the GNA 402-4 to execute various video or audio processing algorithms supported by the features of the multimedia multi-user collaboration application, as represented by AV processing instruction module A 443-1, pursuant to an offload instruction to avoid executing that AV processing instruction using the GPU 402-2 or CPU 402-1. As another example in such an embodiment, the AV processing instruction manager 441 may access the GPU 402-2 or CPU 402-1 to execute the audio or video compression algorithm represented by AV processing instruction module C 443-*n*. In yet another example in such an embodiment, the AV processing instruction manager 441 may access CPU 402-1 to multiplex the processed and encoded audio and video samples into a processed and encoded media sample.

In another example embodiment in which the information handling system 400 acts as the media sink, to receive media samples captured at a remotely located information handling system, the AV processing instruction manager 441 may offload execution of the audio or video decompression algorithm represented by AV processing instruction module C 443-*n* to the GPU 402-2. In another example of such an embodiment, the AV processing instruction manager 441 may offload execution of various video or audio processing algorithms supported by the features of the multimedia multi-user collaboration application, as represented by AV processing instruction module B 443-2 to the GPU 402-2, GNA 402-4, or VPU 402-3. In such a way, the AV processing instruction manager 441 may retrieve audio and video samples from an external media source information handling system and perform one or more processing methods on the retrieved audio and video samples in accordance with offload instructions received from the intelligent collaboration contextual session management system or the MMCA 440.

During operation, the streaming media driver 425 may be executed by a processor of the information handling system to distribute the video frames, in this embodiment, to the AV processing instruction manager 441. The AV processing instruction manager 441 may direct the execution and application of each of the AV processing instruction modules 443-1, 443-2, 443-*n* to each of the video frames. The AV processing instruction manager 441 may cause a one or more of the AV processing instruction modules 443-1, 443-2, 443-*n* to the video frames in series and may, in an embodiment, cause the reapplication of these AV processing instruction modules 443-1, 443-2, 443-*n* to each of the video frames. In an embodiment, any of the background lighting correction AV processing instruction module, the color blending/matching AV processing instruction module, the luminance/brightness blending AV processing instruction module, the outline detection AV processing instruction module, the facial lighting correction AV processing instruction module, and the virtual background blur AV processing instruction module as the AV processing instruction modules 443-1, 443-2, 443-*n* may, when executed, require additional modification by a previously applied AV processing instruction modules 443-1, 443-2, 443-*n* in order to increase the visual composition of the video frames.

By way of example, the AV processing instruction manager 441 may receive input from a user and sensors and provide that data at the ICCSMS neural network to provide, as output, optimized outputs to adjust any AV processing instruction module. The AV processing instruction manager 441 may also receive a video frame for presentation by a MMCA 440. In an embodiment in which the information handling system 400 acts as a media source, the streaming media driver 425 (or other drivers) may execute media capture instructions received from the AV processing instruction manager 441 to instruct capture of video samples via one or more cameras and capture of audio samples via one or more microphones of information handling system 400. As described herein, such media capture instructions may include default media capture instructions stored at the streaming media driver 425 or other drivers, default media capture instructions generated by the MMCA 440, or optimized media capture instructions generated by the ICCSMS neural network and used to provide optimized settings to the AV processing instruction modules described herein. The AV processing instruction manager 441 may also receive any number of the AV processing instructions from the trained ICCSMS neural network as described herein that describe how the visual composition of the video frame is to be changed or augmented through the application of the output AV processing instruction modules. Each of these AV processing instruction modules may be included as one of the AV processing instruction modules 443-1, 443-2, 443-*n* shown in FIG. 4 that is used to change or augment the video frame accordingly.

Where, for example, the background lighting correction AV processing instruction module is to be applied to the video frame, the AV processing instruction manager 441 may cause changes to the lighting and color vectors and shading of a background behind a user. As indicated, the AV processing instruction manager 441 may receive input from a user and sensors and provide that data at the ICC SMS neural network to provide, as output, optimized output settings to adjust the background lighting correction AV processing instruction module. In an embodiment, these corrections may include lighting corrections, blurring of the background, or changing those color vectors and shading associated with the background. Where, for example, the color blending/matching AV processing instruction module is to be applied to the video frame, the AV processing instruction manager 441 may cause color blending/matching processes to be executed, using image statistics of any video frame, to correct the color vectors, shading, and lighting between the background or virtual background and an image of a user. In an embodiment, the color matching provided by the execution of the color blending/matching AV processing instruction module (as augmented by the output settings from the ICCSMS neural network) by the processor may adjust a skin tone of a user where, for example, the background has a majority color vector that has incorrectly changed the hues of the user's skin. This may allow for better skin tone compositions between the virtual background and the user's image so that the user's image stands out more from the virtual background. These adjustments may be done to either or both the background, virtual background, or user's image in order to facilitate this better composition.

The AV processing instruction manager 441 may receive input from a user and sensors and provide that data at the ICC SMS neural network to provide, as output, optimized output settings to adjust an outline detection AV processing instruction module. In an example, the outline detection AV processing instruction module may be applied to the video frame to delineate visually between a user's image in a foreground of the video frames from the background further behind the user. It is common for a user to engage in the video conference session initiated by the MMCA 440 within an office or other room where noise may be eliminated and privacy may be maintained. In these circumstances, the user may be positioned somewhere between the video camera of the information handling system and a wall behind the user. In some instances, the outline detection AV processing instruction module may separate these two planes leaving the user's image in front while, in some embodiments, adjusting the background by blurring the background, color matching the background, adjusting the color vectors, shading, and luminance of the background, or adding in a virtual background to visually replace those images behind the user.

In yet another example, the AV processing instruction manager 441 may receive input from a user and sensors and provide that data at the ICC SMS neural network to provide, as output, optimized output settings to adjust the facial lighting correction AV processing instruction module. The AV processing instruction manager 441 may apply the facial lighting correction AV processing instruction module to adjust the lighting associated with a face of the user presented by the MMCA 440 during a video conference session. The adjustment of the lighting associated with the user's face may be conducted for each video frame presented by the MMCA 440. In some lighting circumstances, the lighting of a user's face (or lack thereof) may cause the charge-coupled device (CCD), the active-pixel sensor (e.g., complementary metal-oxide-semiconductor (CMOS) sensor), or some other image capturing device on a camera to shift color tones within the video frame. When this occurs, colors of the user's face may be shifted incorrectly thereby not reflecting the user's true facial color tones. Such a shift may include red shifting that distorts the actual color of the user's facial image. In these embodiments, the facial lighting correction AV processing instruction module may be executed by the processor to correct for this shift.

In still another example, the AV processing instruction manager 441 may receive input from a user and sensors and provide that data at the ICC SMS neural network to provide, as output, optimized output settings to adjust the virtual background blur AV processing instruction module. The AV processing instruction manager 441 may apply the virtual background blur AV processing instruction module to blur a background or a virtual background presented in the video frames behind the user. As described herein, the virtual background blur AV processing instruction module may blur the background or virtual background in order to increase the visual composition of the user's image and the video frame. In some instances, the ambient light sensor (ALS) and color sensing (CRGB) sensor may indicate that the contrast between the user's image and the background or virtual background may be insufficiently lighted, too bright, or contrasting visually with the colors of the images of the user such that blurring the background would increase the visual composition of the video frame. In an embodiment, the virtual background blur AV processing instruction module may be provided with the data from these sensors as well as others described herein and blur the background or virtual background depending on which AV processing output from the ICCSMS neural network to make adjustments to the virtual background blur AV processing instruction module.

With the video frames changed or augmented by these AV processing instruction modules 443-1, 443-2, 443-n, each video frame may be transmitted to the MMCA 440 used to engage the user in a video conference session. The MMCA 440 may then transmit these video frames to a network 426 via, for example, a network interface device 420. The network 426 may include a server or other network device that allows other users engaged in the video conference session to view these frames.

As described herein, the AV processing instruction manager 441 may be a processor that, in an embodiment, offloads the processing to other types of processing devices such as a GPU, GNA, dedicated CPU, VPU, among others. In an embodiment, the processor may be used during this offload processes used to apply the AV processing instruction modules 443-1, 443-2, 443-n to these devices so that the processor may execute other process such as a word processing application, a visual presentation program or the like in order to better engage with the other users engaged in the video conference session.

Figure 5:
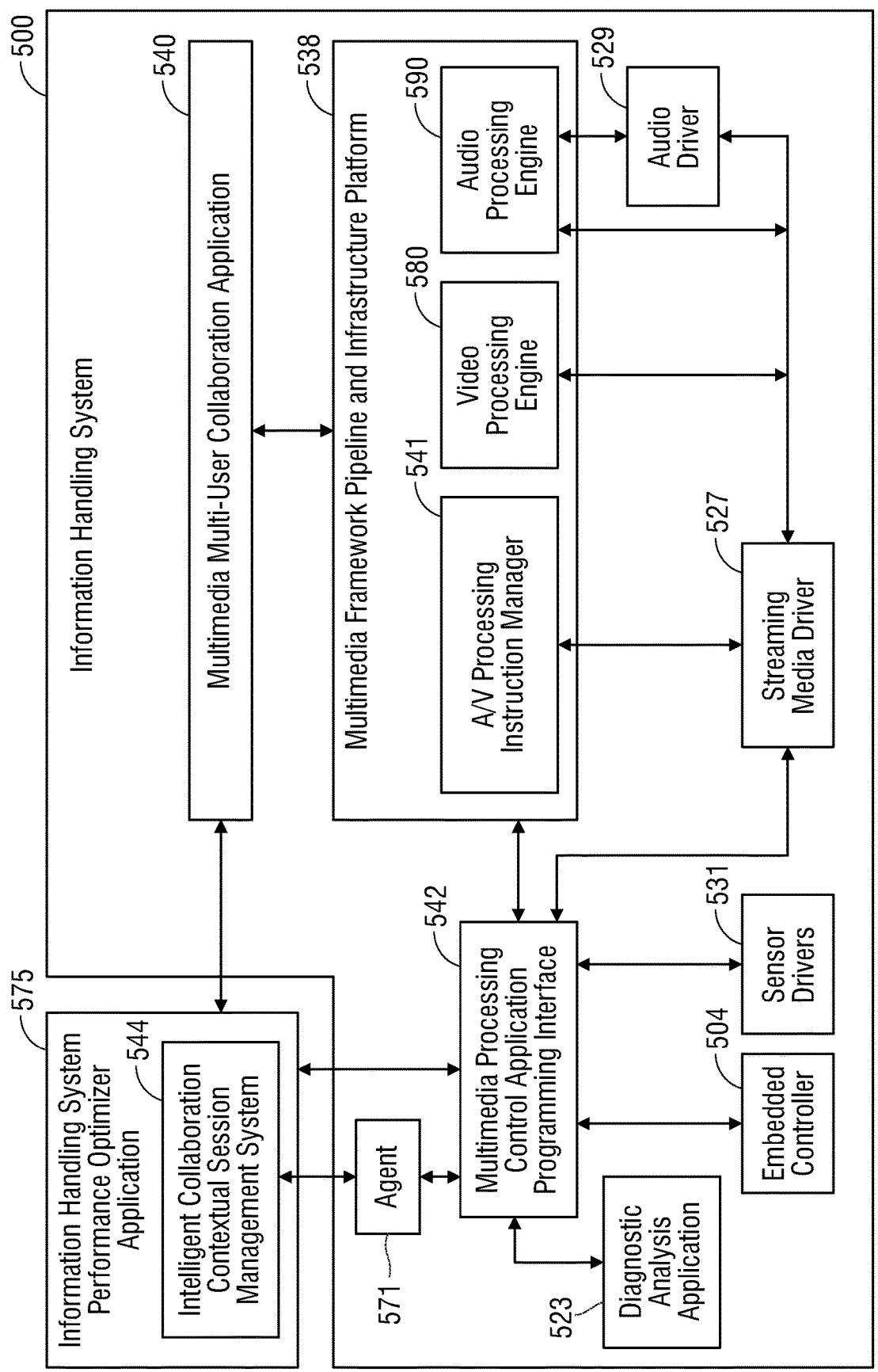
FIG. 5 is a block diagram illustrating a first embodiment of an intelligent collaboration contextual session management system for optimizing information handling system operation of a multimedia, multi-user collaboration application according to an embodiment of the present disclosure.

FIG. 5 is a block diagram illustrating an information handling system 500 according to another embodiment of the present disclosure. FIG. 5 shows the interactions between the different hardware, software, and firmware components of the information handling system 500 relative to an information handling system performance optimizer application 575 that includes a ICCSMS 544. As described herein, the ICCSMS 544 are code instructions executing on one or more processors of an information handling system 500 executing the information handling system performance optimizer application 575, or one or more processors of information handling system 500 participating in a video-conference via MMCA 540. The ICCSMS 544 in an embodiment may generate optimized media capture instructions for optimizing performance of the MMCA 540. In further embodiments, the trained ICCSMS neural network may be used to make optimized adjustments to the AV processing instruction modules that are used to process these video frames produced during execution of the MMCA 540.

In an embodiment, the information handling system performance optimizer application 575 may be an application executed remote from the information handling system 500 such that the user may some AV processing instruction modules enabled at a GUI provided to the ICCSMS 544 neural network over, for example, a network. In an embodiment, the information handling system performance optimizer application 575 may form part of a multimedia multi-user collaboration application (MMCA) not native to the information handling system 500. In this embodiment, the MMCA may be a web-based application that provides the services described herein to multiple users over a network. The ICCSMS 544 neural network may also receive data detected by the sensors and provided from the capture video frames to use the trained ICCSMS 544 neural network to provide, as output, settings used to adjust any of the AV processing instruction modules described herein. This allows the video frames to be adjusted visually to increase the visual composition of the video frames.

The information handling system 500 described with reference to FIG. 5 may represent a transmitting, media source information handling system or a receiving, media sink information handling system in various embodiments. In still other embodiments, information handling system 500 may operate as both a transmitting, media source information handling system and a receiving, media sink information handling system, as may be the case for an information handling system transmitting video of one participant user while simultaneously executing code instructions for the multimedia multi-user collaboration application 550 to display videos of other participants within a shared user session of a video conferencing system. In one example embodiment, the ICCSMS 544 may be an application operating within the OS for the information handling system 500, including execution of a trained neural network for determining optimized settings described herein. For example, the information handling system 500 may execute any or all of the ICCSMS 544 via a processor (e.g., processor 102 executing code instructions of the ICCSMS 144, described with reference to FIG. 1) or embedded controller 504. In another example embodiment, the ICCSMS 544 may be an application operating as part of an information handling system performance optimizer application 575 at an information handling system located remotely from the information handling system 500. In such an example embodiment, an ICCSMS agent 571 or portion of the ICCSMS 544 may be operating at the information handling system 500. The ICCSMS agent 571 of the ICCSMS 544 in such an embodiment may be executing a trained ICCSMS neural network or optionally outputs from a remote trained ICCSMS neural network and may be in communication with the multimedia processing control API 542 via an internal bus of information handling system 500. The ICC SMS agent 571 may also be in communication with the information handling system performance optimizer application 575 via a network interface device, as described in greater detail with respect to FIG. 1.

The information handling system performance optimizer application 575 in an embodiment may operate remotely from the information handling system 500 in an embodiment. For example, the information handling system performance optimizer application 575 may operate on a server, blade, rack, or cloud-based network maintained and controlled by the manufacturer of several information handling systems, or managed by an employer or enterprise owner of several information handling systems, including information handling system 500. In such an embodiment, the information handling system performance optimizer application 575 may operate to monitor certain performance metrics at each of the plurality of such information handling systems (e.g., including 500), perform firmware and software updates, confirm security credentials and compliance, and manage user access across the plurality of information handling systems (e.g., as owned by an employer or enterprise corporation, and including 500).

A neural network of the ICCSMS 544 in an embodiment may make optimization determinations as described herein on a per information handling system basis. Such a determination may be made based upon a plurality of inputs describing hardware and software performance metrics of the information handling system (e.g., 500) at issue, default media capture instructions and default AV processing instruction settings generated by the multimedia multi-user collaboration application (e.g., 550), various sensor (e.g., distance sensor, ALS, CRGB) readings taken at the information handling system (e.g., 500), and meeting metrics for the MMCA 540 describing performance of that application and participation of the user of the information handling system during a user session. These neural network input values may be gathered from a plurality of sensors, peripheral devices, and diagnostic applications, such as described in various example embodiments herein.

The multimedia processing control API 542 in an embodiment may operate, at least in part, as a hub, facilitating communication of each of these performance metrics, media capture instructions, and various sensor readings to the ICCSMS 544, or agent 571 thereof. For example, processing capabilities may indicate processor types available or random-access memory (RAM) or other memory capabilities of an information handling system 500. In a further example, hardware performance metrics describing total processing load at one or more processors may be gathered via an embedded controller 504 in an embodiment, and transmitted to the multimedia processing control API 542. The embedded controller 504 may also gather information describing state of charge for a power management unit, which may include a battery and an AC adapter, as described with reference to FIG. 1. The embedded controller 504 in an embodiment may gather such metrics through direct communication with the available processors (e.g., CPU, GPU, VPU, GNA, etc.) and with the power management unit (PMU). In some embodiments, such communication may occur in kernel mode.

In other embodiments, the information handling system performance optimizer application 575 may be in direct communication with the embedded controller 504 via out-of-band communications. In such embodiments, the hardware performance metrics (e.g., CPU load, current offload instructions, battery state of charge, current positional configuration of information handling system 500) may be determined by the embedded controller 504 in kernel mode and communicated to the information handling system performance optimizer application 575 directly during routine out-of-band communications between the information handling system performance optimizer application 575 and all managed information handling systems (e.g., including 500). Such out-of-band communications with the embedded controller 504 in an embodiment may be used to check security credentials or performance statistics for the information handling systems (e.g., 500), or to push software or firmware updates to the information handling systems, for example. During such routine maintenance, the information handling system performance optimizer application may accumulate, sort, and analyze all performance metrics received from all managed information handling systems (e.g., 500), including processing load across all available processors, default settings associating specific processors with specific tasks, or state of remaining charge of the battery incorporated within the PMU, for example. Out-of-band communications initiated in such a way between the embedded controller 504 and the information handling system performance optimizer application 575 may be via a wireless network such as Wi-Fi or cellular, or via wired connection.

As another example of gathering inputs for a neural network of the ICCSMS 544, software performance metrics may be generated at a diagnostic analysis application 523, based at least in part on communication between the diagnostic analysis application 523 and the processor of the information handling system 500. Such a diagnostic analysis application 523 may operate to gather metrics describing CPU usage or load, as well as a breakdown of the CPU usage attributable to each of a plurality of applications (e.g., including a multimedia multi-user collaboration application) running via the operating system of the information handling system 200. In some embodiments, the diagnostic analysis application 523 may provide similar metrics for other types of processors for the information handling system, including, for example, a graphics processing unit (GPU), vision processing unit (VPU), or gaussian neural accelerator (GNA). One example of such a diagnostic analysis application 523 in an embodiment may include the Microsoft® Diagnostic Data Viewer® software application. In an embodiment, these software performance metrics may be generated at the diagnostic analysis application 523 and transmitted to the neural network of the ICCSMS 544 via multimedia processing controller API 542.

The information handling system 500 in FIG. 5 shows a native MMCA 540 that is executable by a processor of the information handling system 500. Similar to above, the information handling system 500 may be powered on via use of an on switch and a PMU. The PMU may power on an embedded controller 504 that, in an embodiment, executes a basic input/output system (BIOS) and, in an embodiment, an operating system (OS).

During operation, the ICCSMS 544 neural network receives a number of inputs in the form of AV processing instruction modules that have been enabled and sensor data at the ICCSMS 544. The data associated with these selections and sensor data is used as input to a trained ICCSMS 544 neural network to provide, as output, optimized output settings that adjusts those AV processing instruction modules such as the background lighting correction AV processing instruction module, the color blending/matching AV processing instruction module, the luminance/brightness blending AV processing instruction module, the outline detection AV processing instruction module, the facial lighting correction AV processing instruction module, and the virtual background blur AV processing instruction module. Each of these AV processing instruction modules, when executed by the processor, adjust those video frames as described herein.

FIG. 5 further shows that the adjustments to the visual composition of the video frames may be facilitated through the use of a number of sensors such as a camera and other sensors or sensor array. In an embodiment, the sensors may include an ALS and a CRGB sensor. The ALS may detect an amount of ambient light present at the camera or within a room where the user is conducting the video conference session. For example, and in the embodiments here, the sensors may include an ALS and a CRGB that detect the ambient light around the user (e.g., ambient luminance and color/temperature). As an example, the ALS and/or CRGB sensors may primarily be used to auto dim and alter the color of the screen to match the environment (e.g., not full brightness of screen when client is in lower light or dark conditions; and color matching the background environment for morning vs afternoon light, for example). These sensors may help inform, as input, as to how to handle image brightness based on the ambient conditions. As described herein, each of these sensors, along with the camera, may be used to provide data to the processor in order to make those adjustments to the video frames as described herein. Each sensor, may include a sensor driver 531 used by the hardware to interface the hardware with the operating system of the information handling system 500.

During these operations, a number of drivers associated with the streaming media driver 527 may be executed by the processor to enable an OS of the information handling system 500 and other computer programs to access hardware functions of the input/output devices, sensors, and the camera, among others. For example, the sensor drivers of the ICCSMS agent 571 may help to facilitate the transmission of data from the individual sensors to the processor or other processing device such as the AV processing instruction manager 541 responsible for adjusting the visual composition of the video frames as described herein.

As described herein, the streaming media driver 527 in such an embodiment may receive video or audio samples captured by peripheral cameras or microphones in communication therewith, according to default or optimized media capture instructions. In another embodiment, the audio driver 529 may receive audio samples captured by the microphone, for example, in communication therewith, according to such received media capture instructions. In such an embodiment, the audio driver 529 may operate as a mini-driver or child device to the parent device streaming media driver 527. The streaming media device driver 527 may be in communication with an AV processing instruction manager 541 via one or more ports (e.g., as described in greater detail with respect to the of FIG. 4) such that video or audio samples received by the streaming media device driver 527 may be transmitted to an AV processing instruction manager 541, in an embodiment. The audio driver 529 may be in communication with the AV processing instruction manager such that audio samples received by the audio driver 529 may be transmitted to the AV processing instruction manager (e.g., via the audio processing engine, or via the streaming media driver, for example) in an embodiment. In such a way, the AV processing instruction manager may direct retrieval of a video sample captured at a camera operably connected to information handling system 500 and retrieval of an audio sample captured at a microphone operably connected to information handling system 500.

Figure 6:
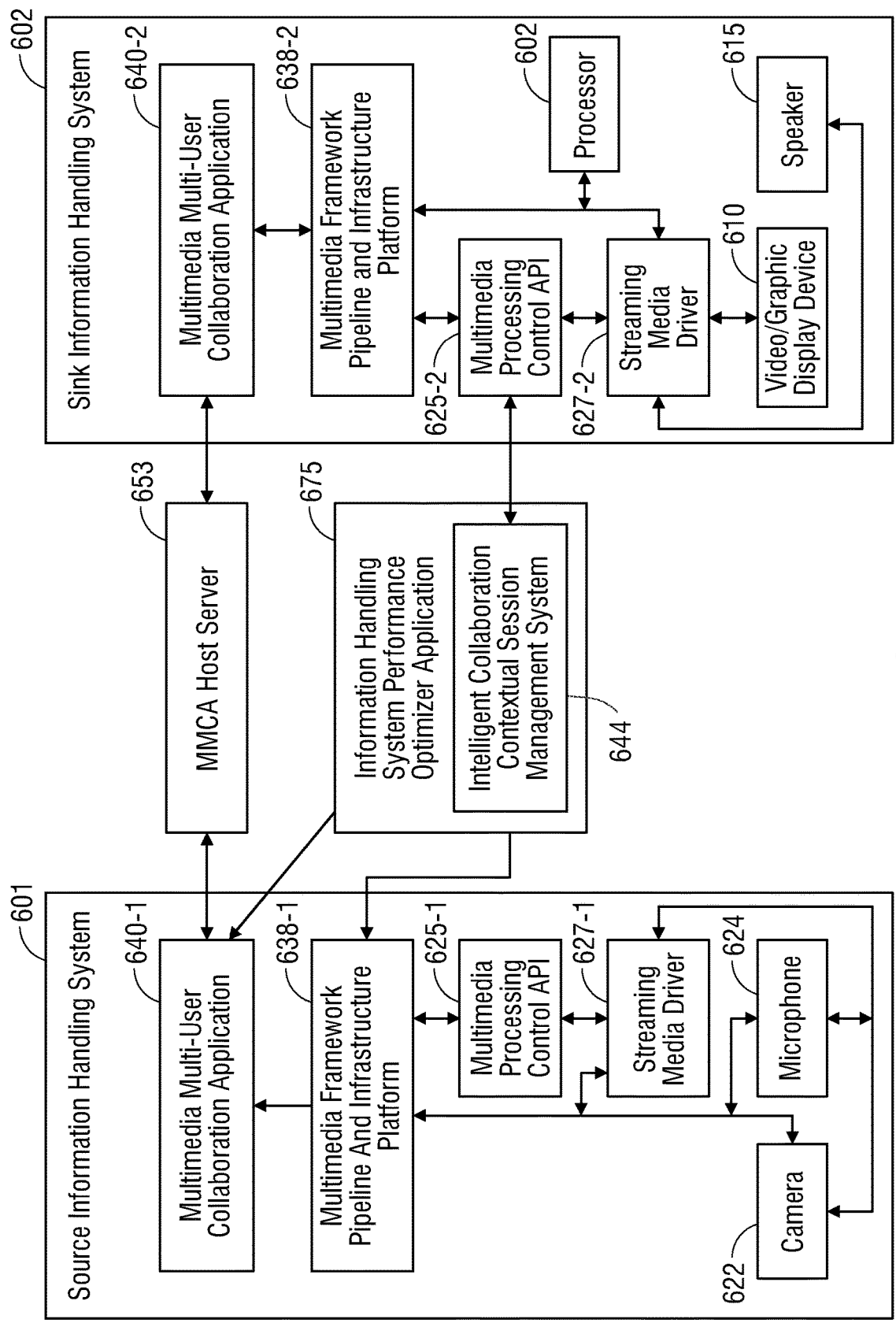
FIG. 6 is a block diagram illustrating a second embodiment of an intelligent collaboration contextual session management system for optimizing information handling system operation of a multimedia, multi-user collaboration application according to an embodiment of the present disclosure.

FIG. 6 is a block diagram illustrating a second embodiment of an ICCSMS 644 for optimizing information handling system operation of a multimedia, multi-user collaboration application according to an embodiment of the present disclosure. User sessions may be hosted and coordinated by a multimedia multi-user collaboration application host server 653 located remotely from, but in communication with one or more source information handling systems (e.g., 601) and one or more sink information handling systems (e.g., 602) via a network.

In an embodiment, the operations and processes conducted by the source information handling system 601 may be similar to those of the sink information handling system 602. Because the source information handling system 601 and sink information handling system 602 are engaged in the execution of an MMCA 640-1, 640-2 and participating in a video conference session, each of the source information handling system 601 and sink information handling system 602 are sending and receiving video frames among each other so that each user of the source information handling system 601 and sink information handling system 602 can view and hear, in real-time, the image and sounds produced by the other user. Therefore, the present specifications contemplate that the source information handling system 601 and sink information handling system 602 may perform concurrently those processes of the other at any given time.

As described herein, the source information handling system 601 and sink information handling system 602 each include a MMCA 640-1, 640-2. The MMCA 640-1, 640-2 may be any application that, when executed by the processor 102, initiate a video conference session between a plurality of users such as between the user of the source information handling system 601 and the sink information handling system 602. With the MMCA 640-1, 640-2 and per the user selections, the MMCA 640-1, 640-2 may present each video frame to the user at a respective video/graphic display device. Examples of a MMCA 640-1, 640-2 may include Zoom® developed by Zoom Video Communications, Skype® developed by Skype Technologies of Microsoft, Microsoft Teams® by Microsoft, WebEx® developed by Cisco, GoToMeeting® developed by LogMeIn, among others.

The MFPIP 638-1, 638-2 may include audio or video processing system of the source information handling system 601 or sink information handling system 602 that applies any number of AV processing instruction modules the each of the video frames created as the video camera (e.g., webcam) provides those video frames to the video conference session executed by the MMCA 640-1, 640-2. In an embodiment, the MFPIP 638-1, 638-2 receives a stream of video frames and, via application of these AV processing instruction modules, adjusts the lighting, shading, and color vectors of each of the images with a trained ICCSMS neural network as described herein. The MFPIP 638-1, 638-2 may also detect the activation or deactivation of a virtual background and adjusts the lighting, shading, and color vectors of the video frames.

Each of the source information handling system 601 and sink information handling system 602 may include a streaming media driver 627-1, 627-2. As described herein, the streaming media driver 527 in such an embodiment may receive video or audio samples captured by peripheral cameras or microphones in communication therewith, according to default or optimized media capture instructions. In another embodiment, the audio driver may receive audio samples captured by the microphone, for example, in communication therewith, according to such received media capture instructions. In such an embodiment, the audio driver may operate as a mini-driver or child device to the parent device streaming media device driver 627-1, 627-2. The streaming media device driver 627-1, 627-2 may be in communication with an AV processing instruction manager via one or more ports (e.g., as described in greater detail with respect to the of FIG. 4) such that video or audio samples received by the streaming media device driver 627-1, 627-2 may be transmitted to an AV processing instruction manager, in an embodiment. The audio driver may be in communication with the AV processing instruction manager such that audio samples received by the audio driver may be transmitted to the AV processing instruction manager (e.g., via the audio processing engine, or via the streaming media driver, for example) in an embodiment. In such a way, the AV processing instruction manager may direct retrieval of a video sample captured at a camera operably connected to information handling system and retrieval of an audio sample captured at a microphone operably connected to information handling system 500.

The source information handling system 601 and sink information handling system 602 may further includes a MPCAPI 625-1, 625-2. The MPCAPI 625-1, 625-2 in an embodiment may operate to facilitate communication between various applications, controllers, and drivers of the information handling system in an embodiment. For example, the MPCAPI 625-1, 625-2 may interface between a MFPIP 638-1, 638-2 and the sensors of the sensor array such as the camera, the ALS, and the CRGB, among others. The MPCAPI 625-1, 625-2 may, during operation of the information handling systems, receive the individual video frames and direct the AV processing instruction modules to be applied per the output optimized setting adjustments from a trained ICCSMS 644.

In the embodiment, the source information handling system 601, as well as the sink information handling system 602, may include a microphone 624 used to receive sounds from the user and, with the audio driver 629 and other audio processing devices, create audio used to accompany the video output by the MMCA 640-1, 640-2. The source information handling system 601, as well as the sink information handling system 602, may include a camera 622 used to capture images of the users while engaged with the video conference session executed by the MMCA 640-1, 640-2.

Similar to FIG. 5 above, FIG. 6 shows the interactions between the different hardware, software, and firmware components of the source information handling system 601 and sink information handling system 602 relative to an information handling system performance optimizer application 675 may include a ICC SMS 644 for training of a trained neural network. In an embodiment, the information handling system performance optimizer application 675 may be an application executed remotely from the source information handling system 601 and sink information handling system 602 such that the trained ICCSMS 644 neural network may be executed remotely and output optimized setting for AV processing instruction modules may be transmitted over, for example, a network. In an embodiment, the information handling system performance optimizer application 675 may form part of a multimedia multi-user collaboration application (MMCA) not native to the information handling system 500. In this embodiment, the MMCA may be a web-based application that provides or helps to facilitate the services described herein to multiple users over a network.

In an alternative embodiment, an agent local to the source information handling system 601 or sink information handling system 602 can receive a trained ICC SMS neural network from the ICCSMS 644. In this embodiment, the agent may execute the trained ICCSMSM locally in either or both of the source information handling system 601 or sink information handling system 602 in order to provide the adjustments to the AV processing instruction module as described herein.

During operation, the information handling system performance optimizer application 675 may be executed on the source information handling system 601 and sink information handling system 602 prior to or during the video conference session the users are engaged in. The information handling system performance optimizer application 675 may be executed locally on the source information handling system 601 or sink information handling system 602 or may be executed remotely as described herein. The information handling system performance optimizer application 675 may present to both the source information handling system 601 and sink information handling system 602 those optimized output settings to adjust the AV processing instruction modules described herein. Again, the ICCSMS 644 neural network may receive, as input, data from a number of sensors and a user to generate those optimized output setting used to adjust those AV processing instruction modules. This input may be based on data describing the user's environment as detected by, for example, a camera, a distance sensor, and/or an ambient light sensor. Additionally, this input data may be data describing a capture video frame.

Figure 7:
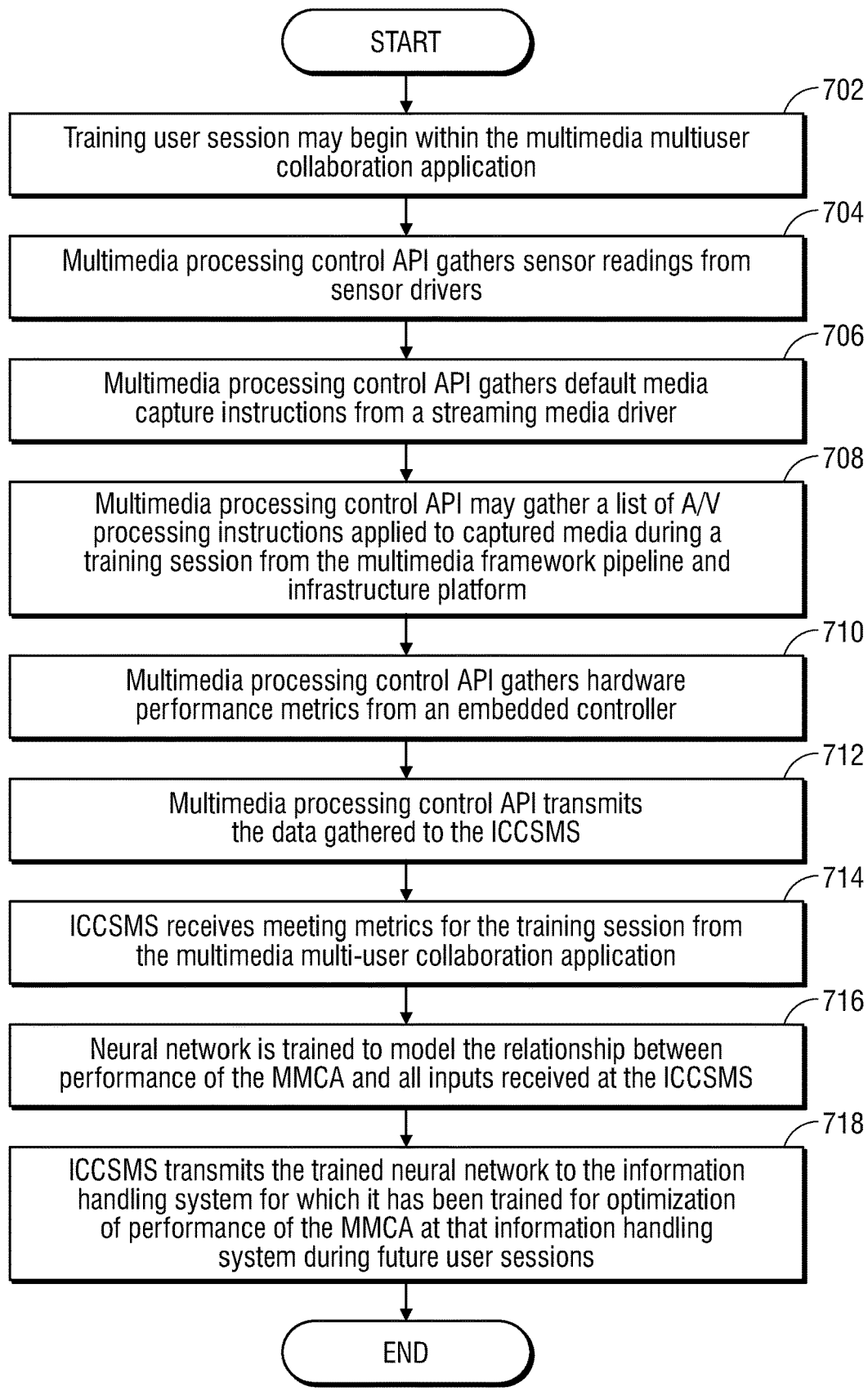
FIG. 7 is a flow diagram illustrating a method of training a neural network to optimize performance of a multimedia multi-user collaboration application of an information handling system according to an embodiment of the present disclosure.

FIG. 7 is a flow diagram illustrating a method of training a neural network of the intelligent collaboration contextual session management system to identify output adjustments to media capture settings, AV processing instruction adjustments, and offload settings that optimize performance of a multimedia multi-user collaboration application during a training user session according to an embodiment of the present disclosure. The intelligent collaboration contextual session management system in an embodiment may gather input variables describing media capture settings for capturing audio and video samples during such a training user session, as well as a list of AV processing instructions performed on these captured samples and the processors that executed these AV processing instructions. These input variables may be gathered for a plurality of training sessions in which a single information handling system participates, in order to tailor the neural network to optimize performance of the multimedia multi-user collaboration application as it is executed at that specific information handling system in an embodiment. The intelligent collaboration contextual session management system may further gather meeting metrics describing performance of the multimedia multi-user collaboration application during such training user sessions. By comparing different settings for the media capture, AV processing instructions applied to the captured media, and the processors used to execute such AV processing instructions to these performance measurements, the neural network may learn to identify settings optimized to produce the best possible performance values for the multimedia multi-user collaboration application during future user sessions in which the information handling system for which the neural network has been trained may engage.

At block 702, a training user session may begin within the multimedia multi-user collaboration application in an embodiment. For example, in an embodiment described with reference to FIG. 6, a source information handling system 601 and a sink information handling system 602 may both join a single user session for the multimedia multi-user collaboration application (e.g., 651 and 652) via a central, networks multimedia multi-user collaboration application host server 653, an agent of which may be operating at both the source information handling system 601 and the sink information handling system 602. It is understood that each information handling system 601 and 602 may function as a media source and as a media sink. A training user session may be differentiated from other user sessions in an embodiment in that applications, drivers, or firmware other than the intelligent collaboration contextual session management system may provide media capture instructions, AV processing instruction adjustments, or offload instructions. Only after such training user sessions have been completed may the intelligent collaboration contextual session management system in an embodiment generate optimized media capture instructions, optimized AV processing instruction adjustments, or optimized offload instructions. A plurality of training user sessions may be completed in an embodiment prior to conclusion of the training phase for the neural network of the intelligent collaboration contextual session management system.

The multimedia processing control API may gather sensor readings from sensor drivers at block 704 in an embodiment. For example, in an embodiment described with reference to FIG. 2, various sensor readings may be taken by the information handling system 200 and communicated to the intelligent collaboration contextual session management system. More specifically, the information handling system 200 may include one or more sensors within a sensor array 230 as described in various embodiments herein. All sensor readings from sensors within the sensor array 230 in an embodiment may be transmitted to the sensor drivers 231. This sensor information in an embodiment may include information used to determine the level of participation of a user in a videoconference user session. For example, an IR camera may sense whether the user of the information handling system is located within a certain distance of the display device. In an embodiment, an ALS may be used to detect the ambient light around the participant or user of the video conference session. Still further, a CRGB may be used to detect a contrast between the user's image and the background or virtual background that may be indicated as being insufficiently lighted, too bright, or contrasting visually with the colors of the images of the user. The multimedia processing control API 574 may forward various sensor readings to the intelligent collaboration contextual session management system 570 for determination of optimized settings using the neural network described herein.

The multimedia processing control API may gather default media capture instructions from a streaming media driver in an embodiment at block 706. For example, in an embodiment described with reference to FIG. 2, default media capture instructions and default AV processing instructions may be gathered via a streaming media driver 225 and transmitted to the intelligent collaboration contextual session management system. Default media capture instructions in an embodiment may be generated by the multimedia multi-user collaboration application, or may be preset by the manufacturer of the camera, microphone, or information handling system 200. It is contemplated that any media capture instructions directing the capture by the camera of images or video or directing the capture by the microphone of audio that do not constitute optimized media capture instructions generated based on the output of the neural network described herein may constitute default media capture instructions. In another example embodiment described with reference to FIG. 5, the multimedia processing control API 576 may receive AV processing instruction modules from the streaming media driver 525 that are used to process the video images received. These AV processing instruction modules may include a background lighting correction AV processing instruction module, a color blending/matching AV processing instruction module, luminance/brightness blending AV processing instruction module, an outline detection AV processing instruction module, a facial lighting correction AV processing instruction module, and a virtual background blur AV processing instruction module. As described, each of these modules may be optimized at any time using a trained ICC SMS neural network that, based on inputs from the sensors, provides output optimized settings to each of these AV processing instruction modules to adjust their functions accordingly.

Such default media capture instructions and optimized media capture instructions may dictate the method by which such audio, image, and video samples are captured. For example, in an embodiment described with reference to FIG. 2, media capture instructions may identify the frames per second at which the camera 222 may capture images for generation of a video, the resolution at which the camera captures and stores such images, the number of key frames in each preset time period, zoom settings, pan settings, or instructions to center the captured image around an identified object. As another example, media capture instructions may identify the bit rate at which the microphone 224 records and saves captured audio samples.

At block 708, the multimedia processing control API may gather a list of AV processing instructions applied to captured media during a training session from the multimedia framework pipeline and infrastructure platform in an embodiment. For example, in an embodiment described with reference to FIG. 2, default AV processing instruction module settings may be gathered via the streaming media driver 225 and transmitted to the intelligent collaboration contextual session management system. In another example embodiment described with reference to FIG. 5, the multimedia processing control API 576 may receive default AV processing instruction module settings from the streaming media driver 525. In other embodiments, the multimedia processing control API 576 may receive default AV processing instruction module settings via direct communication with the multimedia framework pipeline and infrastructure platform 540.

In an embodiment, the gathered AV processing instruction module settings may be associated with any of the background lighting correction AV processing instruction module, color blending/matching AV processing instruction module, luminance/brightness blending AV processing instruction module, an outline detection AV processing instruction module, facial lighting correction AV processing instruction module, and virtual background blur AV processing instruction module as described. In an embodiment, the AV processing instruction module settings may be output from the ICCSMS neural network that are to be used to update these AV processing instruction modules. For example, the AV processing instruction module settings may be output from the ICCSMS neural network as a result of input from the ALS that the lighting is too low at or around the user of the MMCA. In this embodiment, the AV processing instruction module settings may alter the functionalities of the facial lighting correction AV processing instruction module, the luminance/brightness blending AV processing instruction module, the background lighting correction AV processing instruction module among others due to the detection of these low light circumstances. In another example, the CRGB may detect that the background behind the user, whether virtual or real, includes a color variation that blends into the user's skin tone or clothing such that the visual composition is incorrect. As such those inputs to the ICCSMS neural network may create updated AV processing instruction module settings used to adjust the operations of the facial lighting correction AV processing instruction module, the background lighting correction AV processing instruction module, and the color blending/matching AV processing instruction module, among other types of AV instruction module settings.

At block 710, the multimedia processing control API may gather hardware performance metrics from an embedded controller in an embodiment. For example, in an embodiment described with reference to FIG. 5, hardware performance metrics describing total processing load at one or more processors may be gathered via an embedded controller 504 in an embodiment, and transmitted to the multimedia processing control API 576. The embedded controller 504 in an embodiment may gather such metrics through direct communication with the processor (e.g., CPU, GPU, VPU, GNA, etc.). In other embodiments, the information handling system performance optimizer application 575 may be in direct communication with the embedded controller 504 via out-of-band communications. In such embodiments, the hardware performance metrics (e.g., CPU load, current offload instruction) may be determined by the embedded controller 504 in kernel mode and communicated to the information handling system performance optimizer application 575 directly during routine out-of-band communications between the information handling system performance optimizer application 575 and all managed information handling systems (e.g., including 500).

The multimedia processing control API in an embodiment may transmit the data gathered at steps 704-710 to the intelligent collaboration contextual session management system in an embodiment at block 712. By gathering this data, and transmitting it to the intelligent collaboration contextual session management system in an embodiment, the multimedia processing control API may operate as a sensor hub. For example, in an embodiment described with reference to FIG. 5, the multimedia processing control API 574 may forward any received, default media capture instructions, default AV processing instructions, captured audio samples, captured video samples, and various sensor readings to the intelligent collaboration contextual session management system 570 for determination of optimized settings using the neural network described herein. A neural network of the intelligent collaboration contextual session management system 570 may be separately trained for each information handling system (e.g., including 500) in communication with or managed by the information handling system performance optimizer application 575 in an embodiment. Such a training session may be performed based on the neural network input values gathered via the multimedia processing control API 576, as described with respect to FIG. 7 at blocks 704, 706, 708, and 710. Upon training of such a neural network unique to each information handling system (e.g., 500), the neural network may be ready to determine optimized settings for the information handling system for which it was trained (e.g., as described in greater detail with respect to block 716), based on updated input values.

At block 714, the intelligent collaboration contextual session management system in an embodiment may receive meeting metrics for the training session from the multimedia multi-user collaboration application. For example, in an embodiment described with reference to FIG. 5, the intelligent collaboration contextual session management system 570 may be in communication with the multimedia multi-user collaboration application 550 executing the training user session at the information handling system 500. In another embodiment, described with reference to FIG. 6, the intelligent collaboration contextual session management system 670 may receive meeting metrics from the multimedia multi-user collaboration application host server 653 that hosts the training session. The intelligent collaboration contextual session management system 670 may receive one or more meeting metrics describing performance of the multimedia multi-user collaboration application during execution of such a training user session in an embodiment. Such meeting metrics may include, for example, a measure of the CPU, GPU, and other processing resources consumed by the multimedia multi-user collaboration application over time, during the training user session. Other example meeting metrics may include a measure of memory resources consumed. Still other example meeting metrics may compare CPU or other processors or memory usage by the multimedia multi-user collaboration application to total CPU or other processors or memory used by all applications, hardware, or firmware during the training user session. Yet other example meeting metrics may measure lighting conditions at the user's location using an ALS. Still additional meeting metrics may be measured by a CRGB to detect color vectors in the environment where the user is located, color vectors associated with a background (virtual or real), as well as color vectors associated with the user's face and clothing. Still other meeting metrics may include distance metrics related to the distance the user is from the camera and the distance the background is from the camera as measured by a distance sensor.

Such meeting metrics may also describe the performance of media sample processing, transmission, and playback among a plurality of information handling systems engaged in a single user session for the multimedia multi-user collaboration application. For example, meeting metrics gathered by the intelligent collaboration contextual session management system during a training session may describe latency, or a measurement of time elapsing between a first information handling system transmitting the processed, encoded media sample and a second information handling system receiving the processed, encoded media sample. As another example, meeting metrics may include a measurement of jitter, or a comparison between latency of playback for a media sample from one of the meeting participants, and latency of playback for another media sample from another of the meeting participants. Such jitter may cause the two separate media samples, which may have been recorded simultaneously, to playback such that they are out-of-sync with one another. Still other meeting metrics in an embodiment may measure bandwidth consumed by the multimedia multi-user collaboration application, type of network used to transmit and receive media samples, packet loss (e.g., of video or audio samples), resolution and frames per second of video samples (both at the transmitting side and the receiving side), audio bitrate (both at the transmitting side and the receiving side), and one or more codecs or compression algorithms in use. In some embodiments, jitter, packet loss, latency, resolution, and frames per second may be measured separately for one or more of audio samples, video samples, and screen sharing samples. In still other examples, meeting metrics may be gathered by the multimedia multi-user collaboration application host server 653, and may describe the color vectors associated with the user, the user's clothing, and a background (virtual or real), distances between the background and user relative to the camera, and lighting measurements in the location of the user during the video conferencing session.

A neural network may be trained in an embodiment to model the relationship between performance of the multimedia multi-user collaboration application and all inputs received at the intelligent collaboration contextual session management system at block 716. The intelligent collaboration contextual session management system may input each of the values gathered from the multimedia processing control API and the multimedia multi-user collaboration application into a multi-layered, feed-forward, machine-learning neural network to train the neural network to model the relationship between one or more of the input values transmitted at block 712 and one or more performance metrics represented by the meeting metrics gathered at block 714. For example, the neural network may correlate media capture settings, AV processing instruction adjustments, or offload settings with certain meeting metrics for a user session. Such meeting metrics may include the CPU or other processor resource load consumed by the multimedia multi-user collaboration application during a user session, or latency, jitter, or packet loss as measured by the multimedia multi-user collaboration application during a user session.

The intelligent collaboration contextual session management system in an embodiment may model a multi-layered, feed-forward, machine-learning classifier neural network in an embodiment, for example, as a deep-learning 4 (DL4) neural network. More specifically, the neural network in an embodiment may comprise a multi-layer perceptron (MLP) classifier neural network. Several such multi-layered feed-forward, machine-learning classifier neural networks exist in the art, and any of these networks may be chosen to model this relationship between media capture settings, AV processing instruction adjustment, offload settings, and various meeting metrics for the multimedia multi-user collaboration application in an embodiment. For example, the DL4 neural network may operate in a Java programming language (e.g., DL4J), or within the Scala programming language (e.g., DL4S). Other deep-learning neural networks may be modeled using Apache® Maven®, for example. In still other embodiments, the DL4 neural network may be modeled using a plurality of classifiers, including a linear MLP classifier, a Moon MLP classifier, or a Saturn MLP classifier. Each of these types of MLP classifiers in an embodiment may define a different activation function that operates to define a relationship between separate layers of the neural network.

The neural network may include a plurality of layers, including an input layer, one or more hidden layers, and an output layer. The default media capture settings, default AV processing instruction adjustments, default offload settings, and meeting metrics gathered at blocks 704, 706, 708, 710, and 714 may form the input layer of the neural network in an embodiment. These input layers may be forward propagated through the neural network to produce an initial output layer that includes predicted media capture settings, predicted AV processing instruction adjustments, predicted offload settings, and predicted meeting metrics values. Such predicted meeting metrics values in an embodiment may include, for example, CPU resource load consumed by the multimedia multi-user collaboration application, or various other meeting metrics (e.g., latency, jitter, packet loss) for the multimedia multi-user collaboration application as measured during the training session.

Actual or known values for these meeting metrics (e.g., as predicted within the output layer) may have been gathered at block 714 in an embodiment. Further, the intelligent collaboration contextual session management system may have received known values for the media capture settings, AV processing instruction adjustments, and offload settings at block 712. Each of the output nodes within the output layer in an embodiment may be compared against such known values to generate an error function for each of the output nodes. This error function may then be back propagated through the neural network to adjust the weights of each layer of the neural network. The accuracy of the predicted meeting metric values (as represented by the output nodes) may be optimized in an embodiment by minimizing the error functions associated with each of the output nodes. Such forward propagation and backward propagation may be repeated serially during training of the neural network, adjusting the error function during each repetition, until the error function for all of the output nodes falls below a preset threshold value. In other words, the weights of the layers of the neural network may be serially adjusted until the output node for each of the meeting metrics, media capture settings, AV processing instruction adjustments, and offload settings accurately predicts the known values received at blocks 712 and 714. In such a way, the neural network may be trained to provide the most accurate output layer, including a prediction of the multimedia multi-user collaboration application performance, based on various media capture settings, AV processing instruction adjustments, and offload settings.

Such a training of the neural network in an embodiment based on known values received at blocks 712 and 714 during a user session of the multimedia multi-user collaboration application may comprise a single training session. Such a training session in an embodiment may be repeated for several user sessions. Various media capture settings, AV processing instruction adjustments, and offload settings may be applied, and in varying combinations with respect to one another, during these several user sessions. In such a way, the neural network may be trained to predict performance of the multimedia multi-user collaboration application (e.g., as measured by meeting metrics) in a plurality of varying conditions, as described by various combinations of different media capture settings, AV processing instruction adjustments, and offload settings.

At block 718, the intelligent collaboration contextual session management system in an embodiment may transmit the trained neural network to the information handling system for which it has been trained for optimization of performance of the multimedia multi-user collaboration application at that information handling system during future user sessions. For example, in an embodiment described with respect to FIG. 5, upon training of the neural network unique to each information handling system (e.g., 500), the neural network may be ready to determine optimized settings for the information handling system for which it was trained, based on updated input values. In some embodiments, this determination may be made by the neural network operating at the intelligent collaboration contextual session management system 570, located remotely from the information handling system 500. In other embodiments, the trained neural network for information handling system 500 may be transmitted from the intelligent collaboration contextual session management system 570 to an agent 571 thereof, operating at the information handling system 500. In a specific example, the trained neural network, having been trained by the inputs from the sensors, may output optimized settings that adjust the operations of any one of the AV processing instruction modules. For example, where the ALS has detected a low light condition, the ALS may provide these sensor readings to the ICCSMS neural network, via the MPCAPI, as input. The ICCSMS neural network may then operate to output optimized settings that adjust the operations of, for example, a facial lighting correction AV processing instruction module, a luminance/brightness blending AV processing instruction module, a background lighting correction AV processing instruction module, among other AV processing instruction modules. The method for training the neural network in an embodiment may then end.

Figure 8:
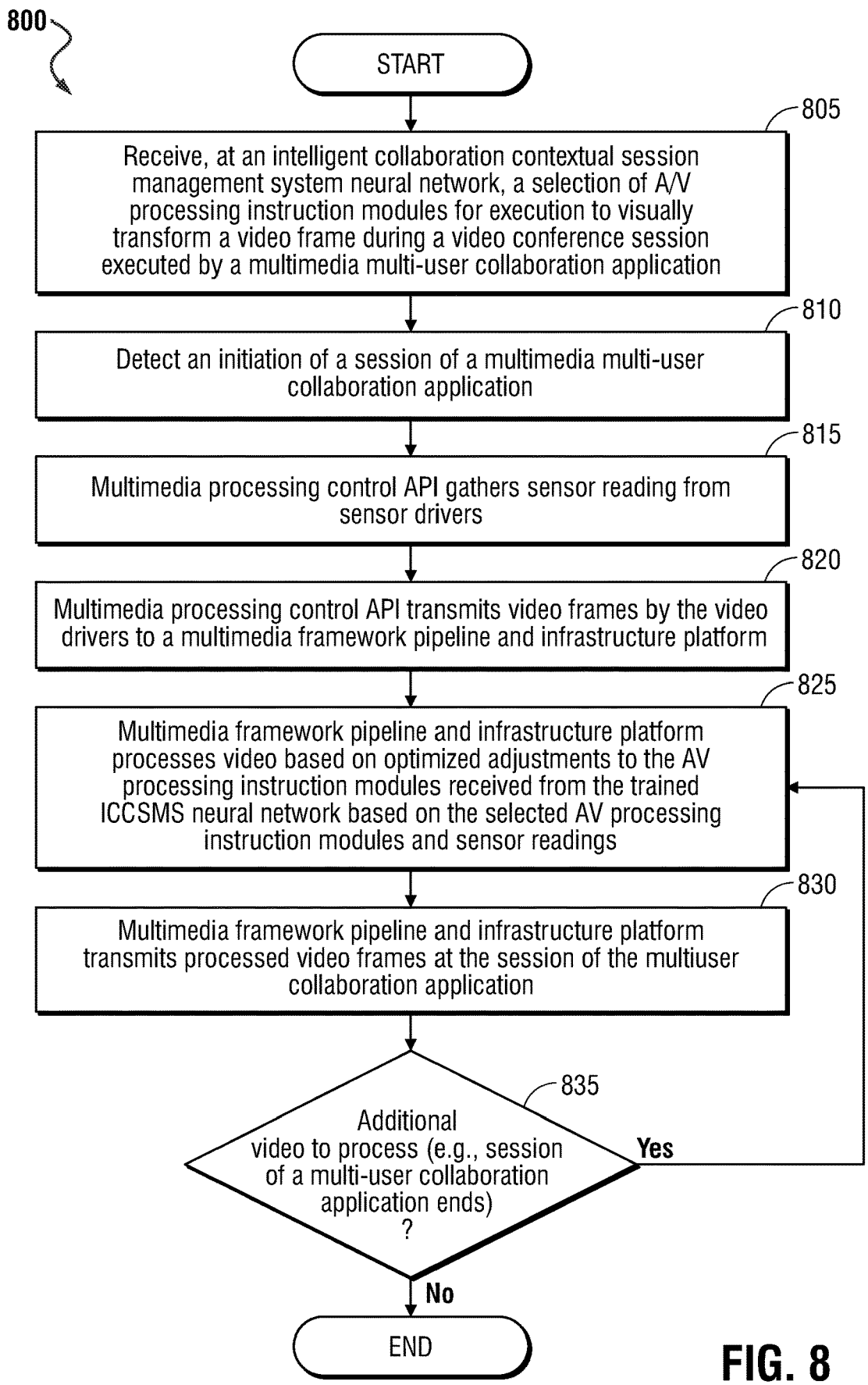
FIG. 8 is a flow diagram illustrating a method of monitoring and adjusting the composition of a video frame during a video conference session according to an embodiment of the present disclosure.

FIG. 8 is a flow diagram illustrating a method 800 of monitoring and adjusting the composition of a video frame during a video conference session according to an embodiment of the present disclosure. The method 800 may begin, at block 805, with receiving, at an ICCSMS, selected AV processing instruction modules for execution to visually transform a video frame during a video conference session executed by a multimedia multi-user collaboration application. In an embodiment, some AV processing instruction adjustments may be automatically selected based on the image received from the video camera. In these embodiments, the lighting or color vectors detected in the image captured may automatically cause the AV processing instruction adjustments to be sent to the ICCSMS neural network indicating how to visually transform the video frame. Further adjustments to the lighting and color vectors may also be selectable by the user via the GUI presented in order to better refine the image to the user's liking.

As described herein, the neural network of the ICCSMS in an embodiment may make such optimization determinations for individual information handling systems separately. Such a determination may be made based upon a plurality of inputs describing hardware and software capabilities and performance metrics of the information handling system at issue, default media capture instructions and default AV processing instruction settings generated by the multimedia multi-user collaboration application, various sensor readings taken at the information handling system, and meeting metrics describing performance of the multimedia multi-user collaboration application. In the context of the present disclosure, the neural network of the ICCSMS may both receive input data indicating the AV processing instruction modules enabled as well as specific sensor data related to the visual transformations to be conducted on the video frames.

The method 800 may also include detecting the initiation of a session of a MMCA at block 810. The MMCA may be any application that, when executed by the processor of the information handling system, initiates a video conference session between a plurality of users such as between the user of the information handling system and another remote user of another information handling system. With the AV processing instruction modules enabled, the MMCA may present each video frame to the user at the video/graphic display device after any video transformations are complete. Examples of a MMCA may include Zoom® developed by Zoom Video Communications, Skype® developed by Skype Technologies of Microsoft, Microsoft Teams® by Microsoft, WebEx® developed by Cisco, GoToMeeting® developed by LogMeIn, among others. It is appreciated that the software or a portion of the software executed to initiate the MMCA may be web-based such that the application or portions of the application run on a server over a network instead of being entirely maintained and executed locally on the OS of the information handling system.

The method 800 may continue at block 815 with a multimedia processing control application program interface (API) gathering sensor readings from one or more sensor drivers and passing those sensor readings onto the trained neural network of the ICCSMS. As described herein, the information handling system may include a number of sensors. Among these sensors may be a video camera that creates one or more video frames, an ambient light sensor, and a color sensing sensor. Any of these sensors may gather data about the environment the user is in (e.g., an office or conference room) or color vectors of the video frame itself. Additionally, each of these sensors as well as other hardware devices used in connection with the systems and methods described herein, use a device driver to interact with the OS of the information handling system. In an embodiment, these drivers may be aggregated into a driver stack that executes the drivers when appropriate or one at a time as the situation requires. In an embodiment, additional sensor data may be sent to the trained ICCSMS neural network and be used as input values. The sensor data of the embodiments herein may be gathered from a plurality of the sensors that includes an ALS, a distance sensor, and/or a CRGB. For example, the ALS may provide to the neural network data describing a lux reading at or near the user. Additionally, the distance sensor may be used to detect the distance of a user relative to the camera as well as the distance of a wall behind the user relative to the camera. Still further, after the camera has provided a video frame to the AV processing instruction manager, certain color aspects of that image detected by the CRGB may be provided as input also to this neural network. With this real-time input, the neural network of the ICCSMS may provide, as output, the optimized AV processing instruction adjustments to one or more AV processing instruction modules (e.g., 443-1, 443-2, 443-n of FIG. 4) to the information handling system.

Once the multimedia processing control API has gathered the sensor readings and data, the method 800 may continue with transmitting the video frames captured by the video camera from the camera drivers to a MFPIP at block 820. The MFPIP may apply any adjusted AV processing instruction modules or device media foundation transforms described herein to each video frame received from the output of the neural network of the ICC SMS in order to change or augment the visual composition of the video frames. In an example, the ALS may detect an amount of ambient light present at the camera or within a room where the user is conducting the video conference session. For example, and in the embodiments here, the sensors may include an ALS and a CRGB that detect the ambient light around the user (e.g., ambient luminance and color/temperature). As an example, the ALS and/or CRGB sensors may primarily be used to auto dim and alter the color of the screen to match the environment (e.g., not full brightness of screen when client is in lower light or dark conditions; and color matching the background environment for morning vs afternoon light, for example). These sensors may help inform, as input, as to how to handle image brightness based on the ambient conditions. Each of these sensors, along with the camera, may be used to provide input data to the trained neural network of the ICCSMS and receive, as output, AV processing instructions adjustments describing how the AV processing instruction modules are to make those adjustments to the video frames as described herein.

The method 800, at block 825, may then continue with the MFPIP processing the video frames based on optimized adjustments to the AV processing instruction modules received from the trained ICCSMS neural network according to the enabled AV processing instruction modules and sensor readings described herein. For example, an AV processing instruction manager of the MFPIP may receive input from a user (e.g., the AV processing instruction modules that have been enabled) to adjust the background lighting or facial lighting within the video frame. Additionally, the sensors may indicate that the lighting around the user is sufficiently low to affect the lighting and color vectors in the video frame. In this example, the AV processing instruction manager may cause the video processing engine to execute one or more of a background lighting correction AV processing instruction module, a luminance/brightness blending AV processing instruction module, a facial lighting correction AV processing instruction module, or any other suitable AV processing instruction module. Where both the lighting associated with the background and the face of the user are to be corrected, the AV processing instruction manager may direct the video processing engine to execute the background lighting correction AV processing instruction module and facial lighting correction AV processing instruction module either separately or in series with the trained ICCSMS neural network output adjustments as described herein. Similarly, the AV processing instruction manager may direct the video processing engine to execute the other AV processing instruction modules to adjust the visual composition of the one or more video frames in accordance with the trained ICCSMS neural network output adjustments. The color blending/matching AV processing instruction module may be executed by processors (e.g., CPU, VPU, GPU, GNA, etc.) associated with the MFPIP and information handling system to perform color blending/matching using image statistics of any video frame to correct the color vectors, shading, and lighting between the background or virtual background and an image of a user in accordance with the trained ICCSMS neural network output adjustments. In an embodiment, the color matching provided by the execution of the color blending/matching AV processing instruction module by the processor may adjust any changes in a user's skin tones where, for example, the background has a majority color vector of similar hues as that of the user's skin tone in accordance with the trained ICCSMS neural network output adjustments. This may allow for better skin tone compositions between the virtual background and the user's image so that the user's image stands out more from the virtual background. These adjustments may be determined by the trained ICCSMS neural network for either or both the background, virtual background, or user's image in order to facilitate this better composition. In an embodiment, the execution of the color blending/matching AV processing instruction module by the processing devices may brighten or darken a background, a virtual background, and/or the image of the user to increase this image composition. In an embodiment, where a drastic image composition is detected such as a harsh color or luminance contrast between the background or virtual background and the image of the user, the execution of the color blending/matching AV processing instruction module may blur the background or virtual background accordingly in order to increase the visual composition of the user's image and the video frame.

The method 800 may further include the MFPIP transmitting any processed video frames to the MMCA that has initiated a video conference session at block 830. This process of application of the device media foundation transforms to each of the individual video frames at block 825 and sending those video frames off to the MMCA may be repeated for every video frame sent to the MFPIP. At block 835, the method 800 may determine whether additional video frames are to be processed. The video frames to be processed may, in an embodiment, end when the video conference session is ended. In this embodiment, because the video conference session has ended, the MFPIP may indicate that all video frames detected by the camera are not to be processed and the method 800 may end. However, when no such indication of the video conference session being ended has been detected, the method may continue at blocks 825 and 830 until there are no more video frames to be processed as described herein. The termination of the video conference session may, in an embodiment, be initiated by any user engaged in the video conference session or may be as a result of a timeout response from the MMCA.

Figure 9:
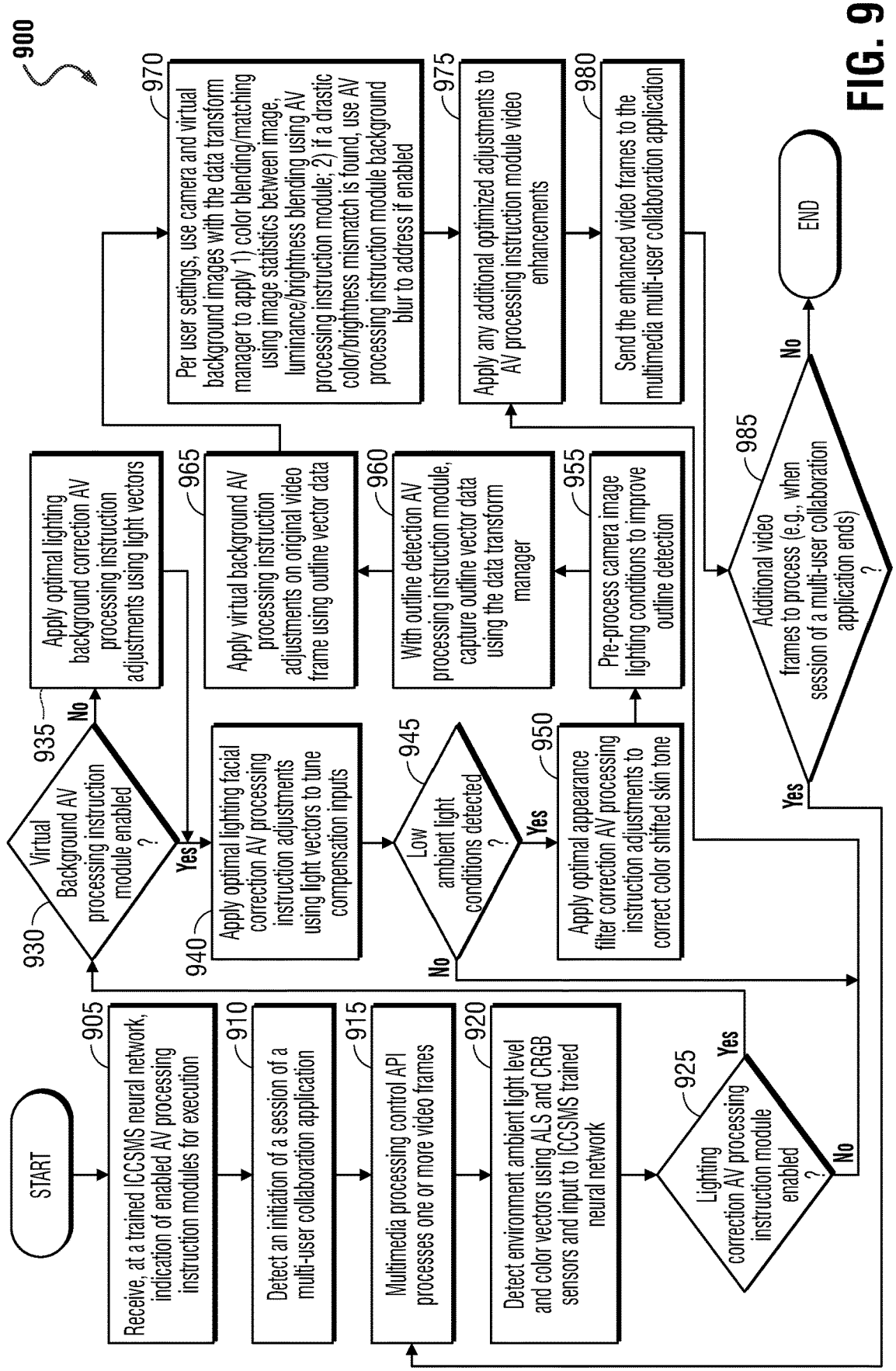
FIG. 9 is a flow diagram illustrating a method of monitoring and adjusting the composition of a video frame during a video conference session according to an embodiment of the present disclosure.

FIG. 9 is a flow diagram illustrating a method 900 of monitoring and adjusting the composition of a video frame during a video conference session according to an embodiment of the present disclosure. In this embodiment, the method 900 may include, at block 905, receiving indication data of enabled AV processing instruction modules at a trained ICCSMS neural network. In an embodiment, the user may further provide some AV processing instruction adjustments described via a GUI in order to prepare to initiate the video conference session.

At block 910, the method 900 may also include detecting an initiation of the video conference session at the MMCA. In an embodiment, this detection of the initiation of the video conference session may result in the applications of the device media foundation transforms described herein, as well as the initiation of the processes conducted on any given video frame produced by the camera and received at, for example, a MFPIP.

The MMCA may be any application that, when executed by the processor of the information handling system, initiates a video conference session between a plurality of users such as between the user of the information handling system and another remote user of another information handling system. With the indication data of which AV processing transform modules are enabled being provided as inputs to the trained ICCSMS neural network, the MMCA may present each video frame to the user at the video/graphic display device after the transformations based on the ICCSMS output adjustments, if any, are complete. Examples of a MMCA may include Zoom® developed by Zoom Video Communications, Skype® developed by Skype Technologies of Microsoft, Microsoft Teams® by Microsoft, WebEx® developed by Cisco, GoToMeeting® developed by LogMeIn, among others. It is appreciated that the software or a portion of the software executed to initiate the MMCA may be web-based such that the application or portions of the application run on a server over a network instead of being entirely maintained and executed locally on the OS of the information handling system.

The method may include, at block 915, with a multimedia processing control API (MPCAPI) processing one or more of the video frames received. The MPCAPI may be any application programming interface that interfaces between the MFPIP and the drivers for the sensors such as the camera, the ALS, and the CRGB, among others. The MPCAPI may, during operation of the information handling system, receive the individual video frames and direct the AV processing instruction modules to be applied per the AV processing instruction adjustments received from the trained ICC SMS neural network. In an embodiment, the MPCAPI may conduct an offloading process where the MPCAPI selects among a plurality of processing resources to apply these AV processing instruction modules to each frame. For example, instead of using the processing resources associated with the processor (e.g., CPU) of the information handling system, the MPCAPI may direct a GPU, a VPU, GNA control logic or some combination of the same to process the data associated with the video frames and their device media foundation transforms (e.g., AV processing instruction modules) based on assessments of the CPU usage or other input to the trained ICCSMS neural network. This may allow for the processor to engage in other processing activities during the video conference session executed by the MMCA. Still further, the MPCAPI may cause data from each of the sensors, via one or more sensor drivers, to be sent to this other processing resource at the MFPIP.

In order to apply any AV processing instruction modules to the video frames and therefore change or augment the video frames accordingly, the method 900 may continue at block 920 with first receiving real-time data related to the ambient light levels within the user's environment and color vectors within any given image using, for example, the ALS and CRGB sensors described herein. In some embodiments, the ALS and CRGB may interact with the image capturing device of the camera in order to gather the necessary data used to initiate the changes and augmentations to the video frames according to the AV processing instruction adjustments received from the trained ICCSMS neural network. Additionally, the trained ICCSMS neural network may operate optimized media capture setting from the camera (or microphone) in some embodiments.

For example, the method 900 may determine whether the lighting correction AV processing instruction module has been enabled. The enablement of the lighting correction AV processing instruction module may be automatic. Additionally, or alternatively, the lighting correction AV processing instruction module may be enabled by a user using a GUI provided by the processor of the information handling system to the user. A selection may be selected by the user in order to help correction for lighting issues within the environment the user is in and may include a customized information from the user for the lighting criteria. For example, the room the user may be in may be either too bright due to sunlight entering into the room or too dark due to poor lighting conditions. Anticipating poor visual quality during the video conference session, the user may select this lighting correction AV processing instructions.

If, at block 925, the lighting correction AV processing instruction module is not enabled, the method 900 may continue with applying any additional optimized AV processing instruction module video enhancements associated with any AV processing instruction adjustments that may be enabled and applied at block 975. The enhanced video frames that were changed or augmented as a result of the application of these AV processing instruction modules video enhancements associated with any AV processing instruction adjustments may then be sent to the MMCA at block 980 for viewing by the user and any other user engaged on the video conference session. The method 900 may then include, at block 985, determining whether additional video frames are to be processed. The video frames to be processed may, in an embodiment, end when the video conference session is ended. In this embodiment, because the video conference session has ended, the MFPIP may indicate that all video frames detected by the camera are not to be processed and the method 900 may end. However, when no such indication of the video conference session being ended has been detected, the method may continue at block 915 again until there are no more video frames to be processed as described herein. The termination of the video conference session may, in an embodiment, be initiated by any user engaged in the video conference session or may be as a result of a timeout response from the MMCA.

Where the lighting correction user optimized transform selection is enabled, the method 900 may continue at block 930 with determining whether the use of a virtual background has also been enabled. In an embodiment, a virtual background may be selected by a user in situations where the user does not wish for other users of the video conference session to see what is behind the user or wants to otherwise include an artificial background behind the user. For example, the user may not want any other user of the video conference session to see or get distracted by events that occur behind the user such as persons walking by a window or the like. The use of the virtual background, therefor, allows those images to be obfuscated during the video conference session and replaced with an image in the video frame simulating a different background or no background (e.g., just a color). In an embodiment, the GUI described herein may provide a user selection that allows the user to enable or disable the virtual background.

Where, at block 930, the virtual background is enabled, the method 900 may continue to block 940. At block 940, an optimal lighting facial correction AV processing instruction adjustment is applied to the video frame using the light vectors detected by the ALS in order to tune any compensation inputs. The optimal lighting facial correction AV processing instruction adjustment received from the trained ICCSMS neural network outputs and may be executed by the processors associated with the MFPIP to adjust the lighting associated with a face of the user presented by the MMCA during the video conference session. In some lighting circumstances, the lighting of a user's face (or lack thereof) may cause the charge-coupled device (CCD), the active-pixel sensor (e.g., complementary metal-oxide-semiconductor (CMOS) sensor), or some other image capturing device on a camera to shift color tones within the video frame. When this occurs, colors of the user's face may be shifted incorrectly thereby not reflecting the user's true facial color tones. Such a shift may include red shifting that distorts the actual color of the user's facial image. In some embodiments, the facial lighting correction AV processing instruction module as provided by the trained ICC SMS neural network may be executed by the processor to correct for this shift. Each of the video frames produced, the images of the user's face may be adjustable according to the user's interactions with the user interface presented by the trained ICCSMS neural network. In other embodiments, the video camera settings may be adjusted with an optimized media capture adjustment from the trained ICCSMS neural network.

Where, at block 930, the virtual background is not enabled as a user optimized transform selection, the method 900 may proceed to block 935 with applying an optimal lighting background correction AV processing instruction adjustment using light vectors to tune compensation inputs. In an embodiment, the optimal lighting background correction AV processing instruction adjustments may be executed by the processors associated with the MFPIP in order to adjust any video frame by correcting the lighting and color vectors and shading of a background behind a user relative to the lighting and color of the image of the user. These corrections may include lighting corrections, blurring of the background, or changing those color vectors and shading associated with the background. In these embodiments, the background lighting correction AV processing instruction module as adjusted by the trained ICCSMS neural network may follow those transform selections provided by the user at the trained ICC SMS neural network described herein in order to make the appearance of the background behind the user relatively more appealing to those viewing the images during the video conference session presented by the MMCA 140. Because no virtual background exists, the user may still wish for any distractions behind the user to be obfuscated and the background lighting correction AV processing instruction module may be used to do this.

Additionally, where the background lighting and color cannot be controlled through the use of a virtual background, the lighting, shading, and color vectors may optionally be corrected. This may be done prior to the processes conducted at block 940 where the facial lighting correction AV processing instruction module is applied to the video frames as described. In an embodiment, the facial lighting/shading can be corrected relative to the detected background at block 940. In this embodiment, the brightness of the facial lighting may be corrected along with applying those optimal lighting background correction AV processing instruction adjustments as described in connection with block 935. Therefore, in an embodiment where the virtual background AV processing instruction module is not enabled, the AV processing instruction adjustments applicable to the lightening or darkening of the real background and the face of the user may be received to adjust the background lighting correction AV processing instruction module and facial lighting correction AV processing instruction module.

The method 900 may further include, at block 945, with determining whether low ambient light conditions have been detected. In this embodiment, the data from the ALS may be used to determine whether a threshold level of lux (e.g., luminous flux per unit area) is detected within the area the user is conducting the video conference session using the MMCA. Where low light conditions are not detected, the method 900 may continue with applying any additional optimized AV processing instruction module video enhancements associated with any AV processing instruction adjustments that may be enabled and applied at block 975 and the processes described in connection with blocks 975-985 may be conducted.

Where the low ambient light conditions are detected (threshold lux reached) at block 945, the method 900 may include applying an optimal appearance filter correction AV processing instruction adjustment to correct color shifted skin tone (e.g., red shifting). In some lighting circumstances such as the low lighting conditions, the lack of lighting on a user's face may cause the charge-coupled device (CCD), the active-pixel sensor (e.g., complementary metal-oxide-semiconductor (CMOS) sensor), or some other image capturing device on a camera to shift color tones within the video frame. When this occurs, colors of the user's face may be shifted incorrectly thereby not reflecting the user's true facial color tones. Such a shift may include red shifting that distorts the actual color of some user's facial image in one example embodiment. In these embodiments, the facial lighting correction AV processing instruction module as adjusted by the trained ICCSMS neural network may be executed by the processor of the information handling system to correct for this color shifting. In an embodiment, the detection of the low ambient light by the ALS at block 945 may also alter the extent that the AV processing instruction module adjustments to the facial lighting correction AV processing instruction module and background lighting correction AV processing instruction module as described in connection with blocks 935 and 940. In an embodiment, the determination of a low ambient light condition may cause the method 800 to adjust or further adjust the facial lighting correction AV processing instruction module and background lighting correction AV processing instruction modules and reapply those adjusted AV processing instruction modules to the video frames.

The method 900 may also include, at block 955, pre-processing camera image lighting conditions to improve outline detection. In this embodiment, any type of AV processing instruction adjustments may be used to lighten the image such that the outline of the user, whether in front of a real background or a virtual background, may be more easily detected. This allows, at block 960, an outline detection AV processing instruction module as adjusted by the trained ICC SMS neural network may be used to capture outline vector data using a data transform manager as described herein. The outline detection AV processing instruction module may, along with data received from the video camera and a distance sensor, delineate visually between a user's image in a foreground of the video frames from the background further behind the user. It is common for a user to engage in the video conference session initiated by the MMCA within an office or other room where noise may be eliminated and privacy may be maintained. In these circumstances, the user may be positioned somewhere between the video camera of the information handling system and a wall behind the user. In some instances, the outline detection AV processing instruction module may separate these two planes leaving the user's image in front while, in some embodiments, adjusting the background by blurring the background, color matching the background, adjusting the color vectors, shading, and luminance of the background, or adding in a virtual background to visually replace those images behind the user. In this instance, execution of the outline detection AV processing instruction module by the processor of the MFPIP results in the MFPIP further altering the color vectors, shading, and luminance of the background, virtual background and/or user's image appropriately in order to increase the visual aspects of the video frames provided to other users during the video conference session.

At block 965, the method 900 may continue with applying a virtual background AV processing instruction adjustment on original video frame using outline vector data at block 960. In this embodiment, because the virtual background user optimized transform selection was selected per block 930, changes to the virtual background and or the user's facial features may be applied. This may be done by executing a color blending/matching AV processing instruction module as adjusted by the trained ICCSMS neural network so that the information handling system performs, for example, a color blending/matching using image statistics of any video frame to correct the color vectors, shading, and lighting between the virtual background and an image of a user. In an embodiment, the color matching provided by the execution of the color blending/matching AV processing instruction module by the processor may tone down any color cluster similarities between the skin tones of a user compared to a background that has a majority color vector of similar hues. This may allow for better skin tone compositions between the virtual background and the user's image so that the user's image stands out more from the virtual background. These adjustments may be done at block 970 to either or both the virtual background or user's image in order to facilitate this better composition. In an embodiment, the execution of the color blending/matching AV processing instruction module by the processing devices may brighten or darken a virtual background and/or the image of the user to contrast or color the face or background to improve image composition. In an embodiment, where a drastic image composition is detected such as a harsh color or luminance contrast between the virtual background and the image of the user, the execution of the color blending/matching AV processing instruction module may blur the background or virtual background accordingly in order to improve the visual composition of the user's image and the video frame.

The method 900 at block 975 may then continue as described herein with applying any additional optimized AV processing instruction module video enhancements associated with any AV processing instruction adjustments that may be enabled and applied at block 980. The enhanced video frames that were changed or augmented as a result of the application of these AV processing instruction modules video enhancements associated with any AV processing instruction adjustments may then be sent to the MMCA at block 985 for viewing by the user and any other user engaged on the video conference session. The method 900 may then include, at block 990, determining whether additional video frames are to be processed. The video frames to be processed may, in an embodiment, end when the video conference session is ended. In this embodiment, because the video conference session has ended, the MFPIP may indicate that all video frames detected by the camera are not to be processed and the method 900 may end. However, when no such indication of the video conference session being ended has been detected, the method may continue at block 915 again until there are no more video frames to be processed as described herein. The termination of the video conference session may, in an embodiment, be initiated by any user engaged in the video conference session or may be as a result of a timeout response from the MMCA.

The blocks of the flow diagrams of FIGS. 7 through 9 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing a multimedia multi-user collaboration application (MMCA), comprising:
   a memory;
   a power management unit;
   a camera to capture video of a user participating in a video conference session;
   a processor configured to execute code instructions of a trained intelligent collaboration contextual session management system (ICCSMS) neural network to receive as inputs:
      the type of AV processing instruction modules enabled descriptive of how to visually transform a video frame during a video conference session executed by a multimedia multi-user collaboration application; and
      sensor data from a plurality of sensors including an ambient light sensor to detect ambient light around a participant of the video conference session and a color senser to detect color vectors in the video frame;
   the processor applies AV processing instruction adjustments to the enabled AV processing instruction modules received as output from the trained ICCSMS machine learning module to adjust the lighting and color vectors of the video frame based on the sensor inputs and the type of AV processing instruction modules; and
   a video/graphic display device to display a graphical user interface to a user to select AV processing instruction module options to visually transform a video frame during a video conference session.

2. The information handling system of claim 1 further comprising:
   the trained ICCSMS neural network generating optimized AV processing instruction adjustments to adjust the lighting and color vectors associated with the virtual background based on the type of AV processing instruction modules and sensor input.

3. The information handling system of claim 1 further comprising: an AV processing instruction manager configured to direct processing resources associated with at least one AV processing instruction modules of the video frame during a video conference session to a second processor based on an optimized offload instruction output from the trained ICCSMS neural network.

4. The information handling system of claim 1 further comprising:
   the trained ICCSMS neural network generating optimized AV processing instruction adjustments to adjust a facial lighting correction AV processing instruction module executed by the processor to detect a color shift in the skin tone of the user and to correct for the color shifted skin tone.

5. The information handling system of claim 1 further comprising:
an AV processing instruction manager to manage, based on the user AV processing instructions, the applications of the AV processing instruction modules to visually transform the video frame during a video conference session; and
the AV processing instruction manager to chain together a plurality of AV processing instruction modules to successively apply and reapply the plurality of AV processing instruction modules to the video frame.

6. The information handling system of claim 1 further comprising:
an AV processing instruction manager configured to direct processing resources associated with the AV processing instruction modules of the video frame during a video conference session; and
the AV processing instruction manager configured to offload video frame processing tasks of at least one AV processing instruction module to a second processor in the information handling system.

7. The information handling system of claim 1, further comprising:
the trained ICCSMS neural network generating optimized AV processing instruction adjustments to adjust the lighting and color vectors associated with the virtual background including blending colors between the virtual background and an image of a user to a background lighting correction AV processing instruction module.

8. The information handling system of claim 1,
the trained ICCSMS neural network generating optimized AV processing instruction adjustments configured to adjust the lighting and color vectors associated with the virtual background by the virtual background detector includes brightening or darkening colors associated with the virtual background based on colors detected in an image of the user.

9. A method of monitoring and adjusting the composition of a video frame during a video conference session, comprising:
with a processor, executing a trained intelligent collaboration contextual session management system (ICCSMS) neural network to receive as input:
indications of enabled AV processing instruction modules descriptive of how to visually transform a video frame during a video conference session executed by a multimedia multi-user collaboration application;
sensor data from a plurality of sensors including an ambient light sensor to detect ambient light around a participant of the video conference session and a color senser to detect color vectors in the video frame;
with the processor, applying AV processing instruction adjustments received as output from the trained ICCSMS neural network to adjust the lighting and color vectors of the video frame based on the sensor inputs and the AV processing instruction modules;
with an AV processing instruction manager, directing processing resources associated with the AV processing instruction modules of the video frame during the video conference session; and
offloading video frame processing tasks of at least one AV processing instruction module to an alternate processing unit of the information handling system.

10. The method of claim 9, further comprising:
the trained ICCSMS neural network adjusting the lighting and color vectors associated with a virtual background enabled as an AV processing instruction module based on AV processing instructions and sensor input.

11. The method of claim 9, wherein:
presenting a graphical user interface to a user, via a video/graphic display device, to select AV from a plurality of processing instruction modules configured to transform and, based on those selections, apply the trained ICCSMS neural network to generate optimized AV processing adjustments to visually transform a video frame during a video conference session with the selected AV processing instruction modules.

12. The method of claim 9, further comprising:
executing the trained ICCSMS neural network generating optimized AV processing instruction adjustments to adjust a facial lighting correction AV processing instruction module executed by the processor to detect a color shift in the skin tone of a user and to correct for the color shifted skin tone.

13. The method of claim 9 further comprising:
with the AV processing instruction manager and based on the user AV processing instruction adjustments, managing which AV processing instruction modules are enabled among a plurality of AV processing instruction modules are used to adjust the video frame during a video conference session; and
the chaining together the plurality of AV processing instruction modules to allow for successive application and reapplication of the plurality of enabled AV processing instruction modules to the video frame.

14. The method of claim 9 further comprising:
with the trained ICCSMS neural network, generating optimized AV processing instruction adjustments configured to adjust with the processor the lighting and color vectors associated with a virtual background by a virtual background detector that includes brightening or darkening colors associated with the virtual background based on colors detected in an image of a user.

15. An information handling system executing an intelligent collaboration contextual session management system (ICCSMS), comprising:
a memory;
a power management unit;
a camera to capture video of a user participating in a video conference session;
a processor configured to execute code instructions of a trained intelligent collaboration contextual session management system (ICCSMS) machine learning module to:
determine that one or more AV processing instruction modules configured to visually transform a video frame during a video conference session executed by a multimedia multi-user collaboration application are enabled;
receive as inputs to the trained ICCSMS neural network, sensor data from a plurality of sensors including an ambient light sensor to detect ambient light around a participant of the video conference session and a color senser to detect color vectors and shading in the video frame;
an AV processing instruction manager configured to direct processing resources associated with at least one enabled AV processing instruction module of the video frame during a video conference session to a second processor based on an optimized offload instruction output from the ICCSMS neural network;
the second processor configured to apply AV processing instruction adjustments received as output from the trained ICCSMS machine learning module to color blend and match the lighting and color vectors of a virtual background relative to an image of a user based on the sensor inputs via the enabled AV processing instructions.

16. The information handling system of claim 15 further comprising:
the trained ICCSMS neural network configured to generate the AV processing instruction adjustments to adjust the lighting within the image based on the sensor data.

17. The information handling system of claim 15 further comprising:
the trained ICCSMS neural network configured to generate the AV processing instruction adjustments to detect a shift in skin tone of the user and to correct for the shifted skin tone.

18. The information handling system of claim 15 further comprising:
the AV processing instruction manager to manage, based on the enabled AV processing instruction modules, the applications of the AV processing instruction modules to visually transform the video frame during a video conference session; and
the AV processing instruction manager configured to chain together a plurality of AV processing instruction modules to allow for successive application and reapplication of the plurality of AV processing instruction modules to the video frame.

19. The information handling system of claim 15 further comprising:
the AV processing instruction manager to manage the applications of the AV processing instruction modules to visually transform the video frame during a video conference session.

20. The information handling system of claim 15, further comprising:
the ICCSMSM neural network configured to generate AV processing instruction adjustments to brighten or darken colors associated with the virtual background based on colors detected in an image of the user based on the sensor inputs for the color shifts and virtual background AV processing instruction modules.

* * * * *